(12) United States Patent
Bader

(10) Patent No.: US 10,933,381 B1
(45) Date of Patent: Mar. 2, 2021

(54) RELATIVE WETTABILITY: WET OIL SEPARATION BY A MEMBRANE

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 0 days.

(21) Appl. No.: 16/873,136

(22) Filed: Feb. 8, 2020

Related U.S. Application Data

(63) Continuation-in-part of application No. 16/501,595, filed on May 6, 2019, now Pat. No. 10,577,257, which is a continuation-in-part of application No. 14/998,774, filed on Feb. 13, 2016, now Pat. No. 10,280,103, which is a continuation-in-part of application No. 14/544,436, filed on Jan. 6, 2015, now Pat. No. 10,259,735, and a continuation-in-part of application No. 14/544,317, filed on Dec. 22, 2014, now Pat. No. 10,259,734, which is a continuation-in-part of application No. 13/066,841, filed on Apr. 26, 2011, now Pat. No. 8,915,301.

(51) Int. Cl.
| | |
|---|---|
| B01D 69/08 | (2006.01) |
| B01D 67/00 | (2006.01) |
| B01D 71/34 | (2006.01) |
| C09K 8/588 | (2006.01) |
| C02F 1/40 | (2006.01) |
| C02F 1/44 | (2006.01) |

(52) U.S. Cl.
CPC ........ *B01D 69/088* (2013.01); *B01D 67/0011* (2013.01); *B01D 71/34* (2013.01); *C09K 8/588* (2013.01); *B01D 2325/20* (2013.01); *C02F 1/40* (2013.01); *C02F 1/442* (2013.01)

(58) Field of Classification Search
CPC .................................................... E21B 43/22
USPC ............................................................ 210/640
See application file for complete search history.

(56) References Cited

U.S. PATENT DOCUMENTS

| | | |
|---|---|---|
| 2,267,548 A | 12/1941 | Berl |
| 2,789,063 A | 4/1957 | Purvis |
| 3,167,119 A | 1/1965 | Meadors |
| 3,330,347 A | 7/1967 | Brown et al. |
| 4,284,509 A * | 8/1981 | Lindorfer ............... C02F 3/344 210/610 |

(Continued)

OTHER PUBLICATIONS

"Low Sulfate Seawater mitigates Barite Scale", Hardy et al, Oil &Gas Journal; Dec. 9, 1996; 94,50 (Year: 1996).*

(Continued)

*Primary Examiner* — Nina Bhat

(57) ABSTRACT

The very purpose of an improved oil recovery or an enhanced oil recovery method is to mobilize oil from an oil-bearing formation as stable wet oil emulsion to an oil gathering center. Yet, the very purpose of the latter is to de-stabilize such a stable emulsion using a multitude of redundant oil-water separation steps and bulky equipment. Methods are herein provided for preparing a material for casting a flat-sheet, extruding a solid-fiber, and/or extruding a hollow-fiber utilizing an aqueous amine solution as an effective solvent to form a crystalline polymorph structure of the material. This material in the form of, for example, an effective and selective oil-wet membrane can be used to simultaneously de-mix oil and water phases from a wet oil emulsion, whether the emulsion is stable or instable.

16 Claims, 18 Drawing Sheets

(56) References Cited

U.S. PATENT DOCUMENTS

| | | | | |
|---|---|---|---|---|
| 4,811,791 | A * | 3/1989 | Harnoy | C09K 8/584 |
| | | | | 166/270.1 |
| 8,863,855 | B2 * | 10/2014 | Kotlar | C12N 1/26 |
| | | | | 166/402 |
| 8,915,301 | B1 | 12/2014 | Bader | |
| 9,138,688 | B2 * | 9/2015 | Prakash | B01D 71/024 |
| 10,258,920 | B1 | 4/2019 | Bader | |
| 10,259,734 | B1 | 4/2019 | Bader | |
| 10,259,735 | B1 | 4/2019 | Bader | |
| 10,280,103 | B1 | 5/2019 | Bader | |
| 10,441,898 | B1 | 10/2019 | Bader | |
| 2006/0032630 | A1 * | 2/2006 | Heins | E21B 43/2408 |
| | | | | 166/266 |
| 2008/0167445 | A1 * | 7/2008 | Podella | C09K 8/582 |
| | | | | 530/350 |
| 2011/0031100 | A1 * | 2/2011 | Qtaishat | B01D 71/54 |
| | | | | 202/205 |
| 2011/0155666 | A1 * | 6/2011 | Prakash | C02F 1/445 |
| | | | | 210/641 |
| 2012/0132588 | A1 * | 5/2012 | Yu | C02F 1/447 |
| | | | | 210/639 |
| 2012/0137883 | A1 * | 6/2012 | Bradley | C02F 3/1273 |
| | | | | 95/259 |
| 2012/0228219 | A1 * | 9/2012 | Goebel | B01D 63/12 |
| | | | | 210/636 |
| 2016/0304358 | A1 * | 10/2016 | Malekizadeh | B01D 15/20 |
| 2017/0056834 | A1 * | 3/2017 | Bhushan | C09D 139/04 |

OTHER PUBLICATIONS

"Analysis of Concentration Polarization Phenomenon in ultrafiltration under turbulent flow conditions", Bader, Veenstra , Journal of Membrane Science 114(1996) 139-148. (Year: 1996).*

"Thermal Degradation of Organic Polymers", Samuel L Madorsky, p. 130-172, Interscience Publishers (Year: 1961).*

"Precipitation and Separation of Chloride and Sulfate Ions from Aqueous Solutions", Bader, Environmental Porgress, vol. 17, No. 2 (Year: 1998).*

"Thermodynamics of Polymer Compatibility in Ternary Systems", Hsu and Prausnitz, Macromolecules , Department of Chemical Engineering, University of California at Berkeley, Berkeley, California, Oct. 9, 1973 (Year: 1973).*

Thermodynamics of ions precipitation in mixed-solvent, Journal of Hazardous Material(1999) 319-3334. (Year: 1999).*

UltraFilter Membranes and Ultrafiltration, John Douglass Ferry, Departmentof Chemistry, Stanford University, California, Oct. 28, 1935. (Year: 1935).*

"Separation of organic solutes from water by low pressure reverse osmosis", A Alsaygh et al. Journal of Environ Science Health, Part A, 28:8, 1993-A28, pp. 1669-1687. (Year: 1993).*

U.S. Appl. No. 16/501,510, filed Apr. 16, 2019, Bader.

U.S. Appl. No. 16/501,595, filed May 6, 2019, Bader.

Bader, M.S.; Vapor-Liquid Equilibrium Properties of Aqueous and Supercritical Fluids at Infinite Dilution; Ph.D. Dissertation, 1993.

Bader, M.S., and Veenstra, J. N.; Analysis of Concentration Polarization Phenomenon in Ultrafiltration under Turbulent Flow Conditions; J. Memb. Sci., 1996, 114, 139-148.

Bader, M.S.; Precipitation and Separation of Chloride and Sulfate Ions from Aqueous Solutions: Basic Experimental Performance and Modeling; Environ. Progr., 1998, 17, 126-135.

Bader, M.S.; Thermodynamics of Ions Precipitation in Mixed-Solvent Mixtures; J. Hazard. Mater., 1999, B69, 319-334.

Ferry, D.; Ultrafilter membranes and ultrafiltration; Chemical Reviews, 1936, 8, 373-455.

Hardy, J.A. and Simm, I.; "Low Sulfate Seawater Mitigates Barite Scale", Oil & Gas J., Dec. 9, 1996, Issue. 50, pp. 64-67.

Hsu, C.C. and Prausnitz, J.M.; Thermodynamics of Polymer Compatibility in Ternary Systems; Macromolecules; 1974, 7, 320-324.

Leverett, M.C.; Capillary behavior in porous solids; Trans. AIME.; 1942, 142, 152-169.

Loeb, S. and Sourirajan, S.; Seawater Demineralization by Means of an Osmotic Membrane; Advances in Chemistry, 1963, 38,117-132.

Madorsky, S.L.; Fluorocarbon and chlorocarbon polymers, in: Thermal degradation of organic polymers, John Wiley & Sons Inc., 1964, pp. 130-172.

Bader, M.S., and Jennings, P.A.; Separation of Organic Solutes from Water by Low Pressure Reverse Osmosis; J. Environ. Sci. Health, 1993, A28, 1669-1687.

Pozzi, Jr., A.L; Fluid flow, porous media, In: J.J. McKetta and W.A. Cunningham (Eds.), Encyclopedia of Chemical Processing and Design; vol. 22. Marcel Dekker, 1985, pp. 323.

Zhang, P. and Austad, T.; Wettability and Oil Recovery from Carbonates: Effects of Temperature and Potential Determining Ions; Colloids and Surfaces A; 2006, 279, 179-187.

Gomari, K.A.R., et al.; Mechanistic Study of Interaction between Water and Carbonate Rocks for Enhancing Oil Recovery; SPE 99628, 2006.

* cited by examiner

| I – Water-Wet | II – Water-Wet Membranes & |
| Formation Matrices | Concentration Polarization Profile |

III – Frequency of σ Inversions

RELATIVE WETTABILITY: WET OIL SEPARATION BY A MEMBRANE

RELATED APPLICATIONS

This application is a continuation-in-part of my allowed patent application Ser. No. 16/501,595 filed on May 6, 2019; which is a continuation-in-part of my patent application Ser. No. 14/998,774 filed on Feb. 13, 2016, now U.S. Pat. No. 10,280,103; which is a continuation-in-part of my patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; which is a continuation-in-part of my patent application Ser. No. 13/066,841 filed on Apr. 26, 2011, now U.S. Pat. No. 8,915,301.

This application is also related to my allowed patent application Ser. No. 16/501,510 filed on Apr. 16, 2019; which is a continuation-in-part of my patent application Ser. No. 15/731,999 filed on Sep. 7, 2017, now U.S. Pat. No. 10,322,952; which is a continuation-in-part of my patent application Ser. No. 15/731,626 filed on Jul. 10, 2017, now U.S. Pat. No. 10,336,638; which is a continuation-in-part of my patent application Ser. No. 13/999,309 filed on Feb. 8, 2014, now U.S. Pat. No. 9,701,558.

BACKGROUND OF THE INVENTION

Water is the origin of every living thing. Yet the function of water—as a lubricant or a solvent, a displacing fluid or a displaced fluid, a wetting fluid or a non-wetted fluid, to name a few—firmly lies at the heart of physical situations that vary from geology (e.g., altering miscibility and interfacial forces), through biology (e.g., de-toxifying wastewater and derivative streams of wastewater), to oceanology (e.g., inverting the salinity of seawater to produce potable water and brine). In geology, FIG. 1 illustrates the critical function of water in accessing, extracting, and processing oil.

FIG. 2 summarizes the known methods to recover oil at different stages from oil-bearing formations. Oil coexists with gas and formation water (brine). The gas and oil occupy the upper zones of the reservoir, and below them there may be a considerable amount of water that extends throughout the bottom zone of the reservoir (FIG. 3-I). When the water is naturally driven, the under pressure water-bearing bottom zone of the reservoir may be referred to as a "naturally active aquifer" or a "natural water drive" (FIG. 3-II).

In the primary oil recovery (FIG. 2); wherein a reservoir pressure is generally well above the oil bubble point pressure, which is, at a fluid pressure equal to the saturation pressure of the gas in total fluids; and wherein the oil-bearing layer extends down to a considerable depth above the water-bearing layer; oil and gas naturally flows through production wells to a surface facility with little water (if any). The former is because the pressure at the bottom of the reservoir exceeds that exerted by the hydrostatic head of the column of oil in the reservoir, and the latter is because of the possibility to arrange the production wells sufficiently high above the oil-water interface. However, when an oil layer in a reservoir is thin and/or the oil-water interface is near the bottom of the reservoir, water co-production may be unavoidable from the start.

During the primary oil depletion, oil production tends to decline over time as the reservoir pressure declines. Pumping (artificial lift) may be used to maintain oil production at an economic rate. If a reservoir pressure falls below the oil bubble point pressure, the associated gas that was initially miscible with oil would separate out, and since the gas has a lower viscosity than oil, gas would flow preferentially to production wells; wherein the viscosity of the oil increases, thereby reducing its mobility. This, in turn, reduces oil production further, even though it may increase the total production of fluids (oil and gas) due to an expansion of the gas channels and thereby increased gas mobility (more gas but less oil production). To maintain the reservoir pressure above the oil bubble point pressure, gas or water flooding may be applied. This oil production stage may be referred to as secondary or improved oil recovery (IOR).

Gas flooding by re-injecting the co-produced gas may be used when there is no feasible economic route to sell it. Yet, gravity separation between the injected gas and oil may cause an early gas breakthrough and a vertical oil sweeping inefficiency. This is due to both low density and viscosity of the gas. The former causes gas to rise above oil, and the latter causes gas to flow preferentially ahead of oil.

In contrast, water flooding is preferred for the opposite reasons to gas flooding (gas is a profitable product and gravity separation may be a hindrance). Almost always at the start of water flooding, water from a free source (e.g., seawater) is used with minimal pre-treatment, regardless of its chemistry contrasts with formation water especially in terms of scale pairing species, radioactive scale tendency, and souring/corrosion tendency, provided that the injectivity is not drastically affected by its content of total suspended solids (TSS) and oxygen (oil content as well in the case of using produced water). Here, water co-production becomes unavoidable.

The silent ramifications of injection water after minimal treatment often incur huge deferred expenditures. In addition to the problems as depicted in FIG. 4, injection of incompatible water, nearly without exception, blocks formation pores and reduces formation permeability. This, of course, does not result in a sustainable oil recovery, but it could provide a short-lived oil production boost on the expense of frequent operation failures. If water flooding was conducted via a proactive economic practice, it would be still inexpensive since it generates neither scale/radioactive scale when mixed with formation water, nor metal sulfides/oxides, nor hydrogen sulfide (souring/corrosion); thereby obviating these issues from the start.

Tertiary or enhanced oil recovery (EOR) may then follow (FIG. 2), which involves injecting a fluid or fluids into a reservoir to extract: (1) some of the trapped, by-passed and/or residual oil in main production zones as well as in transition zones (paleo oil) that cannot be produced from just pressure maintenance by water or gas flooding; and/or (2) immobile oil (e.g., heavy oil and extra heavy oil) that cannot be produced due to viscosity obstacles. Here, IOR and EOR methods may be overlapped, and water co-production may become excessive, especially in thermal [e.g., hot water and steam], thermal-gas [e.g., water-alternating-gas (WAG)], chemicals, and water path diversion EOR methods.

The common factor among most implemented IOR and EOR methods is water. Proactive IOR by water flooding actually requires compatible de-scaled saline water whereas EOR by chemicals and water path diversion also require nearly the same. IOR by water flooding may require low salinity de-scaled water (e.g., a sandstone formation) while EOR by hot water, WAG, and steam (e.g., once through steam generators [OTSG]) also require nearly the same. Yet, it is rarely the case to provide proper treatment for the needed water from the start, except when water is needed for steam injection, which may be imposed by guidelines of steam generators' manufacturers, even though such guidelines may be arbitrarily or contradictory in the overall chemistry of the treated water. But even then, if an oil field was managed but not owned by a giant player, the cost of the water treatment for steam generators would be somehow unrealistically expensive.

It could then be said that the implementation of an IOR or EOR method is driven by giant players as a 50/50 (could go either way) or a long shot (a remote success) project; wherein an actual owner of an oil field may act like a horse on ice; has no choice in the matter at all, whether to improve or reject the method. The tantalizing target is of course to maintain a lame oil production quota essentially during a favorable oil price. However, water treatment to access oil should be neither too slack (water injection) nor pseudo tight (steam injection), yet it is expensive either way and has no resiliency as if an oil-bearing formation is a ground for trial and errors and endless maintenance. This is not to say that technical difficulties within oil-bearing formations are a simple matter. It is thus not surprising that the overall oil recovery ratio (RR) from most mature oil reservoirs is about 20-40%, which is feebly low. Here, RR is the volume ratio of the recovered oil to the original oil-in-place (OOIP).

Now, most conventional giant oil reservoirs have already been explored and new explorations tend to be very marginal. The remaining unexplored reservoirs are located in the remote and harsh Arctic and Antarctic, let alone environmental constrains. If environmental concerns set aside, unconventional reservoirs (heavy and extra heavy oil, oil shales, shale gas, etc.) require either steam, thereby very energy intensive; or enormous amounts of fracking water, thereby co-producing copious amounts of water. This indicates that there will be re-implementations of IOR and EOR methods in the already explored conventional oil reservoirs, particularly carbonate oil-bearing formations, which many are naturally and highly fractured, and wherein most trapped, by-passed and residual oil reside, thereby water will remain the essential displacing fluid.

It stands therefore to reason to regard water as one of the defining variables, which is the challenge, not only in declining or improving oil production in conventional reservoirs but also in initiating hydrocarbons production in unconventional reservoirs. As intentionally drawn in FIG. 1, water and oil (hydrocarbons) may well be imagined as a pot (FIG. 1-I) or a bike (FIG. 1-II). The "pot" (or "bike") represents the oil-bearing formation. One "handle" ("wheel") represents the needed water to access oil, and the other "handle" ('wheel") represents the unwanted excess water to be separated from oil. In order to hold the pot steady, both handles must be grasped. It is clear, therefore, that the term "oil recovery" refers to operations in which the value of the recovered oil exceeds its actual total production cost, which can be expressed follows:

$$E_O = S_R - [C_E + C_P + C_m] \quad (1)$$

where $E_O$ is the overall economy of the oil recovery operation, $S_R$ is the sale revenue from the produced oil, $C_E$ is the cost of injecting water (as well as other fluids) at a surface facility to access oil, $C_P$ is the cost of separating water from the produced wet oil at another surface facility, and $C_m$ is the cost of maintaining the entire elements involved in oil recovery operations from injecting water (and other fluids) through oil-bearing formations to separating water from the produced oil, including deferred oil production.

But, does the past offer a parallel? If it does, a wave of essentially the same IOR and EOR, with maybe new labeling, will be expected in an attempt to improve oil recovery of the already explored conventional oil reservoirs. Such attempts, again, may well be based on wholly taking an oil-bearing formation, leaving the water challenge and its economic efficiency entirely or partially out of consideration. What if (FIG. 1) the lacking physical insight within the "pot" ("bike") had been improved (detailed, rather than generalized, characterizations of an oil-bearing formation including heterogeneities in terms of porosity, permeability and wettability) but the "handles" ("wheels")? What would then be left out?

The water (or a fluid) source and its attributes, even the seemingly trivial and/or invisible ones, could provide clues to at least economic solutions. There may be no or insignificant economic improvement in oil recovery, even if there were adequate trapped, by-passed and/or residual oil left behind, unless there is also a sustainable economic vision for water (or a suitable fluid such as, for example, carbon dioxide); to access oil and to be removed from the produced wet oil. On the one "handle" ("wheel") of the "pot" ("bike") [FIG. 1], the importance of economically treating injection water to access oil has been advocated by the inventor (see e.g., U.S. Pat. Nos. 7,093,663; 7,789,159; 7,934,551; 7,963,338; and 8,197,696). The other "handle" ("wheel") of the "pot", which is the removal of water from wet oil, is the subject of this invention. Before embarking on the latter subject, it is important to establish some understanding of the physical processes involved in oil recovery, thereby understanding the nature of produced wet oil.

Macroscopic and microscopic sweeps dictate the efficiency oil recovery, which are essentially controlled by the porosity, permeability and wettability of oil-bearing formations. Porosity relates to the amount of oil in place, permeability relates to the rate at which oil can be produced, and wettability relates to the manner fluids flow through pores and pore throats. Macroscopic sweep relates to the simultaneity of the formation larger grid; wherein heterogeneity (variations in porosity and permeability), fractures, compartments and sink holes influence oil movement and the oil path to production wells. Microscopic sweep is belong to the relative influence of the smallest part of the grid in the formation; that is the wettability state of pores and pore surfaces, which takes on importance only in connection with the fluids it holds together (trap, flow, or anywhere in between). This grid, larger and smaller, is neither spectacular nor dull, but a code that needs interpretation to navigate tricky formation zones; thus it may tell everything or nothing, depending on how it is interpreted.

Improving the quality of water in flooding operations, modifying injection-production wells spacing and patterns, and modifying the viscosity of injection water (fluids) are examples of navigating the macroscopic sweep efficiency. Navigating the two main forces (viscous and capillary) acting on an oil droplet in a pore space is the key to improve the microscopic sweep efficiency. This may be described by the capillary number ($N_C$), which is the ratio of these forces (viscous/capillary) as follows:

$$N_C = \left[\frac{\upsilon \mu}{\varepsilon \sigma}\right] \quad (2)$$

where $\upsilon$ is the velocity of the displacing fluid, $\rho$ is the viscosity of the displacing fluid, $\varepsilon$ is the porosity of the pore, and $\sigma$ is the interfacial tension between the displacing fluid and the displaced fluid. $\sigma$ may be generally extended further to include the hydrostatics of fluids by relating it, among others, to: (1) the curvature of the fluid-fluid interface (J) and the difference in the capillary pressures of the fluids using Laplace relationship as [σJ]; (2) the contact angle (θ) between the fluids and the solid pore using Young relationship as [σ cos (θ)]; or (3) the radii of the curvature of the fluid-fluid interface and the difference in the capillary pressures of the fluids using the combined Young-Laplace relationship. The contact angle (θ) specifies the pore's wettability for fluids, which can be related to the pore's external and/or internal surface roughness, thereby having a significant effect on the fraction of oil that is ultimately recoverable.

In essence, Eq. (2) assesses the transition of fluids displacement between viscous and capillary forces as well as the domination of one of these forces over the other. Also, Eq. (2) reveals the origins and the defects of proposed and implemented IOR and EOR methods. Furthermore, Eq. (2) reveals the origin and the stability notion of micro- and nano-emulsions as opposed to instable macro-emulsions, which, in turn, relates to their reversals in processing produced wet oil at a surface facility; in other words, it allows us to look at opposites and see situations we normally overlook.

For conventional water flooding, $N_C$ may be in the order of $10^{-7}$ to $10^{-6}$. This small $N_C$ suggests that the displacement of fluids is dominated by capillary forces, and merely forcing water through a formation matrix would not displace much of oil. To substantially increase $N_C$ [Eq. (2)], viscous forces should be substantially increased ($\upsilon$, $\mu$, or both); capillary forces (σ) should be substantially decreased; and/or combinations thereof. The viscosity of the displacing fluid can be made higher than that of the displaced fluid using a polymeric material as a thickener, if the essential conditions for hydrodynamic stability can be met. But even if the viscosity and/or the velocity of a displacing fluid were made sufficiently high, the viscous forces would dominate; thereby rendering the microscopic displacement deficient. Yet, it may be neither possible to apply sufficiently high pressure gradients between wells to substantially increase the velocity of the displacing fluid alone, nor to maintain this velocity while injecting a viscosity-thickened displacing fluid.

The plausible way then to substantially increase $N_C$ is to ultimately make σ vanish altogether at the critical point (or even the dew point) at which fluids become a wholly miscible phase, or to make σ as small as possible (preferably approaches zero) by emulsification. The critical point requires injecting dry gas at extreme temperature and pressure conditions (e.g., high quality dry steam) or extreme pressure conditions (e.g., a supercritical fluid possesses a low critical temperature), which may be not possible to reach the critical temperature and/or pressure due to reservoir constrains. Emulsification involves mixing chemical materials with injection water or driving slugs of concentrated chemical materials by injection water (e.g., synthetic surfactants), which may easily lose their effectiveness to reduce σ due to their excessive adsorption on reservoir formation, thereby leading to their rapid depletion as they pass through the formation before reaching the target oil-water interface. Yet, the costs of these methods (e.g., steam, supercritical fluids, and synthetic surfactants), almost without exception, may very well be prohibitive, particularly when carried into practice on larger-scale applications, even if satisfied the necessary conditions for an actual oil displacement in an actual reservoir.

The possible economic prohibition was intuitively predicted early in the history of water flooding (see e.g., U.S. Pat. No. 2,267,548). Ideas that may enable economic increase of oil recovery in conjunction with water flooding (reduction of θ) at manageable operation conditions have since then followed to satisfy this long foresaw need. Such ideas included finding free sources for additives (similar to finding free water sources for water flooding), developing cheaper additives, using lesser amounts of additives, and even more popularly converting or promoting the conversion of naturally occurring surface active species in oil (e.g., carboxylic acids) into in-situ soaps.

Here, the distinction among soaps, detergents and synthetic surfactants deserves highlighting in passing. Soaps are the long known anionic emulsifying agents, which are the alkali (sodium) salts of the long chain fatty acids derived from naturally occurring fats (e.g., glyceryl tristearate) and oils (e.g., coconut, rosin or tall oil). They primarily comprise $C_{16}$ and $C_{18}$ carboxylates, but may also comprise lower ($C_8$) or higher ($C_{22}$) molecular weight carboxylates. Soaps are made today by essentially the same principles as were discovered by the ancient Egyptians thousand years ago. Animal fat is heated with lye (sodium hydroxide); therefore, it is saponified to produce glycerol and sodium salts of fatty acids:

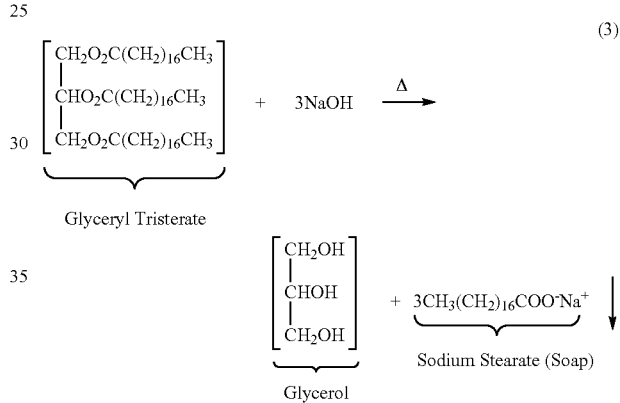

(3)

One additional step is usually carried out before distilling glycerol from the drawn off water layer, which is drying the precipitated soap by a water absorptive salt that forms hydrates such as anhydrous sodium sulfate (forms $Na_2SO_4 \cdot 7\text{-}10H_2O$) or other drying agents (e.g., magnesium sulfate forms $MgSO_4 \cdot 7H_2O$, calcium chloride forms $CaCl_2 \cdot 2\text{-}6H_2O$, or even the sparingly water soluble calcium sulfate that forms $CaSO_4 \cdot \frac{1}{2}\text{-}2H_2O$). Wood ashes, which comprise bases such as potassium carbonate, were also used instead of lye.

A soap molecule therefore comprises a long hydrocarbon chain and an ionic polar end. The hydrocarbon chain is hydrophobic (oil-wet) thereby soluble in non-polar organics, whereas the ionic end is hydrophilic (water-wet) thereby soluble in water. As such, the entire soap molecule neither dissolves completely nor remains completely undissolved, but is readily suspended in water since it forms micelles, wherein their hydrocarbon chains cluster together and their ionic ends attach to water. Thus, the value of soaps is that it can emulsify oil so that it can be displaced. Here, an emulsion is a suspension of fine oil droplets mixed in water. This ability to act as an emulsifying agent, which promotes the formation of an emulsion, arises from two properties: (1) the hydrocarbon chain of a soap molecule dissolves in non-polar organics such as oil droplets; and (2) the anionic end of the soap molecule, which is attracted to water, is repelled by the anionic ends of the molecules protruding from other droplets of oil. Because of similar charges of the carboxylate groups, oil droplets repel each other; thereby they cannot coalesce but remain suspended. Soaps are useful emulsifying agents when used in soft water, but their main drawback is that they precipitate with hard water, which typically comprises calcium, magnesium, iron, and/or other divalent and trivalent cations as follows:

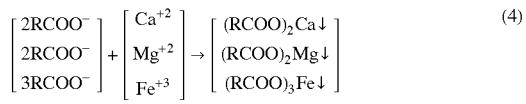

$$\begin{bmatrix} 2RCOO^- \\ 2RCOO^- \\ 3RCOO^- \end{bmatrix} + \begin{bmatrix} Ca^{+2} \\ Mg^{+2} \\ Fe^{+3} \end{bmatrix} \rightarrow \begin{bmatrix} (RCOO)_2Ca\downarrow \\ (RCOO)_2Mg\downarrow \\ (RCOO)_3Fe\downarrow \end{bmatrix} \quad (4)$$

Early in the 20$^{th}$ century, detergents were developed to avoid precipitation with divalent and trivalent cations in hard water by sulfonation of alkyl benzene with fuming sulfuric acid or sulfur trioxide, but such detergents were hardly biodegradable. In mid 1960s, detergents were made of straight chain or linear alkyl benzene, which produced more readily biodegradable sulfonates, and the most known one is sodium dodecyl benzene sulfonate ($RSO_3^- \ Na^+$). Sulfated organics constitute another group of detergents, which differ from the sulfonated ones in that the sulfur atom is linked to the parent molecule through an oxygen atom, whereas sulfur atom in the sulfonated detergents is directly linked to a carbon atom of the parent molecule. Sodium dodecyl sulfate ($ROSO_3^- \ Na^+$) is an example of the sulfated type detergent. A variety of synthetic surfactants then followed using more complex and expensive chemical materials, wherein the hydrophilic end is not necessarily limited to anionic species but also extended to include cationic or neutral species. Here, the main role of an effective synthetic surfactant is to reduce σ by disrupting the hydrogen bonding on a water surface by positioning its hydrophilic head on the water surface and extending its hydrophobic tail away from the water surface.

Soaps, detergents and synthetic surfactants are generally derived from "surface active agents", and made up by combining a hydrophobic portion and a hydrophilic portion in different forms. When a proper balance between these two antagonistic portions exists in a tailored agent for a well controlled and specified target, only then it would activate surface properties in a useful manner. Such agents are often related to the characters of their colloidal and/or precipitation natures in water, which are driven by their ionization (acid-base reactions), solubilization (aqueous solubility limits as a function of temperature and ionic strength), and/or combinations thereof. Complete ionic surface active agents (both ionic hydrophobic and hydrophilic portions) ionize in water. Incomplete ionic surface active agents (a neutral hydrophilic portion) do not completely ionize, but owe the solubility of their hydrophilic portions to the combined effect of a number of weak solubilizing groups (e.g., ether linkages or hydroxyl groups). Yet, such agents are often defined according to their behavior in water, which can influence interfacial tension by emulsify oil (decreasing σ) or de-emulsify oil (increasing σ), wet surfaces, penetrate porous surfaces, dispersed solid particles from surfaces, and produce foam when agitated. All of these attributes are interrelated; thereby no surface active agent possesses only one of them to the complete exclusion of the rest. That is to say that a surface active agent may be called, for example, an emulsifying agent rather than a wetting agent because of its ability to emulsify oil is greater than its wetting ability.

In-situ generation of soaps or detergents as opposed to direct injection of synthetic surfactants therefore seems more appealing, especially when trapped oil comprises sufficient naturally occurring surface active species, simply because the making of soaps or detergents presumably takes place in the oil-water interface, where they are most needed. However, the required amount of an additive(s) used in practical water flooding, whether to promote the generation of soaps or detergents in-situ or to directly inject synthesized surfactants, is high. This arises from two inherent issues. First, a significant amount of water is usually needed for flooding, which, in turn, proportionally requires a large amount of additives, even though the overall concentration of the additives in the water seems low (e.g., within 10 wt % or less). Second, the heterogeneous nature of an oil-bearing formation and its intricate interactions imply a lack of control (e.g., more loses of additives, more changes of additives' properties in transit, and/or combinations thereof), which generally renders the formation matrix unsuitable as a chemical reactor. Taking these issues together along with the fact that precise tailoring of an efficient surface active agent requires also controlled environment, it cannot hope to be used to an extent infer from laboratory experimental results.

Nevertheless, adaptations have been attempted to essentially reduce σ by chemical materials. One example [see e.g., U.S. Pat. No. 3,330,347] was the injection of a slug of a carboxylic acid (e.g., stearic acid) dissolved in light hydrocarbons and subsequent injection of lye to form in-situ soaps at the oil-water interface; or by injecting lye alone without the carboxylic acid if the oil contains sufficient amounts of naturally occurring carboxylic acids. Here, the key disadvantage (among others) is that the presence of divalent and trivalent cations in formation water and the possible dissolution of such cations from the formation matrix itself, precipitate the in-situ generated soaps; thereby not only possibly plugging oil-containing pores but also adsorbing on the pore surfaces.

Another example [e.g., U.S. Pat. No. 3,167,119] was the injection of a slug of sulfuric acid, fuming sulfuric acid, a sulfonic acid containing a chloro or a fluro group such as chlorosulfonic acid or flurosulfonic acid, or a water soluble gas such as sulfur trioxide that immediately reacts with water to form sulfuric acid. The injected or generated acid reacts with naturally occurring aromatic and olefinic constituents and/or basic constituents of oil to form in-situ detergents. Here, the key disadvantage (among others) is corrosion. In defining corrosion in oil fields, H. A. Stiff stated in 1958: "It is the holes in the industry's pockets". This described the profound impact of corrosion in economy of expression, with relevance extended far beyond a limited intended purpose of an approach solely concerned with oil recovery.

As already pointed out, oil is least recovered from carbonate formations. More than half of the world's oil today is available in these formations (e.g., limestone, dolomite and magnesite). Many such formations may be naturally fractured, wherein the formation distinctly comprises matrix and fractures. The matrix is intertwined by an extensive network of natural fractures or fracture-like channels; a profound formation heterogeneity, wherein each having its own characteristic porosity and permeability, and wherein the permeability of the fractures may far exceed the permeability of the matrix. During the primary oil recovery, the reservoir pressure is quickly declined through the highly conductive fractures and channels, which may leave behind about 90% of OOIP. For essentially the same reason, water flooding by itself cannot sufficiently displace since water tends to seep through the same, thereby grossly by-passing the oil in the pores. Only oil that is left behind in the fractures, after the primary oil recovery, may thus be recovered by water flooding. This leads to early water breakthrough, thereby quickly reaching very high water cuts in produced wet oil, which may very well halt production.

Yet, wetting heterogeneity is a distinct factor particularly in carbonate formations, which is contrary to the erroneously long held assumption since 1941 that: "inasmuch as reservoir pores were saturated with formation water prior to oil migration, the pores must be water-wet". The ionic charge on the surface of limestone matrix (chalk, fossiliferous, etc.), for example, may be positive when the pH below 8.3, neutral at pH of about 8.3; and negative above pH of 8.3. A typical pH range in a subsurface formation may be between 4 and 5.5 due to the existence of acid gases (e.g., carbon dioxide, hydrogen sulfide, etc.), and water miscible (low molecular weights) carboxylic acids. The surface of the formation matrix is thus positively charged. Oil typically contains both naturally occurring basic and acidic constituents, and their proportions depend on the nature of oil. The presence of significant amounts of naturally occurring basic constituents in oil suggests that their salts might be formed under acidic conditions just as the salts of naturally occurring acidic constituents (e.g., carboxylic soaps and phenol salts) might be formed under basic conditions. It is therefore expected that σ may exhibit two lower values; one at either condition of the pH scale. It is also expected that the adsorption of oil droplets (wettability state) to carbonate surfaces at either condition of the pH scale is significant, which hinders the movement of oil in the pores (trapping) either way. As the ionization equilibrium displaces naturally occurring reactive constituents in oil toward their natural hydrophobic molecular forms (acidic constituents under acidic conditions or basic constituents under basic conditions) and/or as the presence of polar species (e.g., poly-ring aromatics, asphaltene and resins) becomes significant, the pores become more hydrophobic (oil-wet); thereby the relative permeability to water remains low over a wide interval of water saturations. It can be said then that the carbonate matrix could largely possess a plethora of wide ranges of local contact angles both above and below 90°, depending on the proportions and competition between naturally occurring reactive constituents (basic and acidic) in oil at a given pH condition. It can also be said that the relative permeability to water becomes higher, thereby the carbonate matrix becomes water-wet only when the oil is non-polar; that is to say the competing effect of naturally occurring reactive constituents (basic and acidic) is marginalized or neutralized by an equal antagonistic opposition, and the presence of polar species is marginal, which is hardly the case.

It has been assumed that if the carbonate matrix was sufficiently water-wet, the very limited case in carbonate formations, a limited oil recovery by water flooding may be possible. In the past, one approach was injecting water into the fractures and allowed it to remain in contact with the formation matrix for an extended period of time ranging from several months to several years by shutting down wells. Water, during this contact period, was spontaneously imbibed into the matrix whereas oil was expelled by a countercurrent imbibition into the fractures and swept to production wells. Here, of course, lost revenue due to deferred oil production during the contact period might out weight the short-lived marginal gain in oil recovery; a gain that, after all, may very well be due to re-establishing a sufficient pressure during the capping of the reservoir. Along these lines, what was suggested more recently (in the past decade), which was also based on another long held erroneous assumption, was that if the carbonate matrix was sufficiently altered to a water-wet state by injecting fluids, oil recovery would be improved. Here, too, the premise of this recent approach is based on using "cheap" chemical additives, as opposed to expensive chemical additives to generate in-situ soaps and detergents or injection of synthetic surfactants. The questions are: (1) what is the nature of this approach?; (2) what are these "cheap" chemical additives?; and (3), are they effective or damaging?

In this recent approach, laboratory experiments of flow and imbibitions through chalk core (about 99% calcite) were conducted by adjusting the pH to about 8.4 (or a higher pH of about 9.3) to at least neutralize the chalk matrix or to make it negatively charged instead of naturally positively charged using synthetic seawater with varying sulfate concentrations (up to 4-times the sulfate concentration in seawater), synthetic brine either completely nullified of alkaline cations (magnesium, calcium, strontium and barium) and metals, reduced in calcium and magnesium concentrations (to about their concentrations in seawater) or increased magnesium concentration (higher than that in seawater), and lye to adjust the pH at different temperatures and pressures. By changing the charge on chalk matrix (from positive to neutral or negative) via changing the pH (from acidic or near neutral conditions to slightly basic conditions), the whole idea is based on that some of the negatively charged hydrophobic and strongly adsorbed naturally occurring acidic constituents in oil (carboxylic acids; RCOOH) to the chalk core surface under acidic conditions may be released under slightly basic conditions by forming amphiphilic alkaline soaps (($RCOO^-$)$_2Ca^{+2}$), and presumably simultaneously disrupting the bridge between the negative formation surface and the positive calcium by the excessive sulfate ions of the 4-times sulfate enriched seawater. Here, the adsorption and precipitation of the formed alkaline soaps is assumed to be exchanged by, when in reality is added to it, not only the adsorption and precipitation of calcium sulfate (if not also the precipitation of strontium, barium and radium sulfates), but also the adsorption and precipitation of magnesium hydroxide as well as the adsorption of naturally occurring basic constituents in oil at a higher pH. As simplified in FIG. 5, this is an ultimate dissatisfaction of conflicting quadruple problems. On the one hand, the formation of alkaline soaps and magnesium hydroxide, and the adsorption of naturally occurring basic constituents in oil (ionization towards their molecular forms) depend on the change in the pH (acid-base reactions). On the other hand, the precipitation of calcium sulfate depends on the solubility limits of its hydrates as a function of temperature and ionic strength (e.g., sodium chloride concentration). All suffer appreciable adsorption and precipitation on the pore surfaces.

Table 1, for example, indicates that naturally occurring basic constituents, as reflected by their basic number, in actual oil from carbonate bearing formations exceed naturally occurring acidic constituents (acidic number), wherein the basic constituents react in an opposite way to the acidic constituents in oil; thereby they cannot be ignored. As shown in FIG. 5, a higher (basic) pH displaces the ionization equilibrium of basic constituents towards their molecular forms, which are hydrophobic; unlike their hydrophilic ionized states at a lower (acidic) pH. Basic constituents of high molecular weights thus gain their tendency to adsorb on the carbonate matrix surface, where they are strongly anchored. As such, if the release acidic constituents (e.g., RCOOH) from the carbonate matrix alone was the goal, there would be immediately encountered by the adsorption of basic constituents (e.g., $RNH_2$).

To test small cleaned chalk core samples with dead fluids, a modified or model oil, synthesized seawater and formation water, and lye in a laboratory setting is one thing; to implement the approach into the actual complexity of a carbonate matrix and fluids is another. Changes in pH are rather subtle in a natural reservoir setting, but even if the pH of normal seawater or 4-times sulfate enriched seawater (7.7-8.1) is held in subsurface formation to cause a dramatic pH swing by injecting copious amounts of modified seawater and assuming existing acid gasses in downhole as well as the generated hydrogen sulfide from the conversion of the 4-times sulfate enriched seawater by reducing bacteria are all equally neutralized by the generated calcium carbonate (basic) from the dissolution of chalk core, a basic additive such as lye is still required to alter the charge on the carbonate matrix because conditions sufficiently basic in a natural reservoir setting are very rare. As such, the idea of using a cheaper chemical does not hold. Historically, for water flooding practices (1956), lye was used in some experiments, but was soon discarded when scale plugging effects developed, even though lye, in itself, could reduce σ to a level as low as 0.001 mN/m at given experimental conditions. Table 2, for example, presents ion compositions in seawater, 4-times sulfate enriched seawater by Nanofiltration [(NF), which is the NF reject stream], and formation water from different geological locations. If the equivalent of the 4-times sulfate enriched seawater was generated by NF at 75% recovery ratio; that is 75% sulfate-depleted NF product stream and 25% 4-times sulfate enriched NF reject stream, then there would be no cheap making of such a fluid. Yet, if the use of 4-times sulfate enriched seawater was effective, then the NF product stream (sulfate-depleted seawater) would not be actually practiced [Hardy and Simm; 1996] to solve severe barium sulfate scale plugging, let alone improving oil recovery, in sandstone matrix wherein, unlike chalk matrix (e.g., Table 2; S3N), the presence of calcium in formation water (e.g., Table 2; S4N) and the dissolution of calcium from the matrix itself are not an issue to additionally cause severe calcium sulfate scale. As such, if reducing the costs by chemical materials such as lye and/or and a fluid such as the 4-times sulfate enriched seawater alone were the goal, there would be no economic achievements.

The reduction in σ by injecting sulfate-depleted seawater (e.g., 13.5 mN/m), normal-sulfate seawater (e.g., 7.3 mN/m), and 4-times sulfate enriched seawater (e.g., 6.1 mN/m) is insignificant to improve oil recovery. This range of σ (6.1-13.5 mN/m) actually falls within almost any water flooding operation, wherein σ is reduced from a characteristic value in the order of 50 mN/m to values about 1-10 mN/m. An appropriate reduction of σ for improving oil recovery should be within 0.05 mN/m, and a preferable reduction of σ should be within 0.005-0.001 mN/m. It seems that the observed oil displacement in such laboratory experiments was most likely attributed to increasing the miscibility of the fluids at a high temperature (130° C.). As such, if oil recovery alone was the goal, there actually would be no improvement in real reservoir settings.

If scale plugging, souring, and corrosion alone were the goal, there would actually be real achievements (FIG. 4). Table 2, for example, presents the disparities in ion compositions among seawater from different locations, nanofiltration (NF) reject streams as examples of 4-times sulfate enriched seawater, and formation water from different carbonate-based reservoirs. Alkaline cations (calcium, strontium, barium, radium, and/or combinations thereof) present in formation water, and the released calcium from the carbonate matrix itself, pair with sulfate in the injected seawater, let alone the 4-times sulfate enriched seawater. Their deposits would occur on the surface of the carbonate matrix, and on everything metallic material comes in contact with saturated water in any of the alkaline cation sulfates. Due to the reactive nature of the carbonate matrix, such scale deposits, especially calcium sulfate, would be more pronounced on the oil-bearing pores; thereby causing blockage of the pores, closure of the annulus, as well as heavy scaling of rods, tubes, pumps and flow lines. The accumulating sulfate scale deposits bring about rather a reduction in oil recovery and necessitate heavy expenditures for remedial workovers. Hydrogen sulfide (e.g., souring of produced fluids as well as corrosion and cracking of metallic materials) and metal sulfides (e.g., sulfides deposits of iron and other metals) are also by-products of downhole sulfate reducing bacteria; these alone, when considered aside from the sulfate scaling aspects, would suffice to cause a major failure of oil production.

It may be a principle that all things are at least created twice; where one ends (e.g., soaps), the other begins (e.g., detergents). Adaptations (e.g., synthetic surfactants) of such creations may follow, which is largely re-arranging the known creations to solve problems. These three categories represent a continuum, each connected, perhaps loosely, to the other, but each succeeding one presumably proactively focused on improving the negative attributes of the proceeding one. However, when one or more of negative attributes of creations combined, the adapted solution is worn down inward by the negative attributes themselves, and worn out outward by the reshaped ones into new problems where none existed before.

Rather, attention should be re-directed to the following facts. First, a strongly water-wet or oil-wet matrix may be the very minority, and the influence of either one on oil recovery by water flooding may be best described as follows [Pozzi; 1985]: "For a completely water-wet core, a large percentage of the original oil in the core is recovered before water breakthrough and little additional oil is recovered after breakthrough. For a completely oil-wet core, the oil recovery prior to breakthrough is much less but considerable amounts of oil are produced afterwards." In other words, water flooding in both cases is characterized by rapidly reaching uneconomic production of water-oil ratios (wet oil), whether early or delayed water breakthrough.

Second, the whole idea of generating soaps or detergents in situ or injecting synthetic surfactants during water flooding is presumably centered on increasing the water wettability of the matrix and/or reducing σ between oil and water; thereby increasing the ability of the matrix to imbibe water and expel oil. However, in a water-wet or an altered matrix to a water-wet state, the non-wetting oil droplets are trapped as quasi-spherical ganglia in the pore spaces. This is neither ideal nor favorable for oil recovery, where it is essential to allow the flow of both fluids.

Third, any oil reservoir does have enough potential for complexity arising from intricate interactions of solids (formation matrix) and fluids (gas, oil and formation water), but more so in carbonate-based oil reservoirs. The minerals in the formation matrix, the reactive and polar species in the oil, and the scale forming ions in the formation water alter the wettability of pores by a range of interactions comprising acid-base interactions, precipitation of asphaltenes and resins, precipitation of inorganic scale pairing species, and combinations thereof. This leads to natural mixed-wettability, with a wide range of local contact angles both above and below 90'; wherein the wettability of the pore (solid), and the contact angle of fluids (liquid, gas or combinations) are affected by the local surface roughness of the pore; wherein the surface roughness goes hand-in-hand with an enlarged pore surface area; and the surface roughness, whether it increases or decreases wettability, depends on the degree of the local contact angle as related to a smooth surface. This mixed-wettability, may not be ideal, but certainly facilitates the flow of both water and oil, which is favorable for improving oil recovery, providing that σ is sufficiently reduced. This is also contrary to long held erroneous preference of altering this mixed-wet state to essentially more uniformly water-wet state.

From these simple facts, it should be apparent then that research and development work on altering this mixed-wettability to preferentially water-wet would be a waste of time and money, and that in-situ soaps or detergents generation or synthetic surfactants injection for reducing a would make no impact on improving oil recovery except for particular very small oil production applications. Instead of taking the risk of potentially damaging oil-bearing formation by the pointed out schemes, a naturally distinct mixed-wettability is suitable to allow the flow of fluids in both liquid and gas phases. If that is so, then the long term future of improving oil recovery by water flooding would be in its augmentation with a gas; wherein the latter, for the same economic and practical reasons of using water, needs also to come from a free source, whether it is natural or a waste stream.

If we take the Arabian Gulf area as an example, and Kuwait as a more specific example, many oil reservoirs are carbonate-based, and the main industries are power-seawater desalination co-generating plants, oil refining and petrochemicals, which they produce immense amounts of flue gas and/or carbon dioxide and are within very short distances from oil fields. In a series of patents [e.g., U.S. Pat. Nos. 10,258,920; 10,259,734 and 10,259,735; Allowed U.S. patent application Ser. Nos. 16/501,595 and 16/501,510], the inventor has shown how power-seawater desalination co-generation plants, for example, can be made essentially a free source of both carbon dioxide and sulfate-depleted brine (also depleted in both magnesium and calcium ions); the much needed fluids, for improving oil recovery in nearby oil reservoirs, which the latter supply hydrocarbons to the power-seawater desalination co-plants; as well as increasing potable water production and reducing energy consumption in the power-seawater desalination co-generation plants themselves, which consume a significant portion of the produced hydrocarbons from oil reservoirs. These mutual benefits, as described in such inventions, are forcibly captured in FIG. 6; wherein air emissions, brine rejections and hydrocarbons consumption from the power-seawater desalination co-plants would be all reduced, and hydrocarbons recovery from oil reservoirs would be increased. Innovation, the foundation of the future, thrives from a de-scaling step that not only effectively de-scale seawater to feed desalination plants, which the latter, in turn, produce more potable water at less energy consumption and reject scale-depleted brine at lesser amounts; but also slip-streams of the de-scaled seawater can be used to scrub flue gas, thereby rendering it harmless and liberate carbon dioxide. The elimination of otherwise intractable substantial operating and silent environmental costs, in itself, may over defray the cost of the de-scaling step and with greater benefits to the overall system's performance and distillate production. All of the products from the de-scaling step are yet commercially viable, and if desirable or necessary, all of the de-scaling step's additives are also recyclable. The latter indeed would produce just an enriched magnesium sulfate stream, if it was useful as a displacing fluid in carbonate formations, but as explained above, it would not.

What is left is an infrastructure to compress and transport carbon dioxide to very nearby oil reservoirs. Management will in time be judged not by subsidizing more rework and much waste, but by plans and innovation through improvement of products and services for the future. If carbon dioxide was available, it would be the most practical fluid to improve or enhance oil recovery in both water flooded and matured as well as in both carbonate and sandstone oil reservoirs. Carbon dioxide, more than any fluid, has also the potential to mobilize and displace the remaining paleo oil from water transition zones (FIG. 3-II), since many oil reservoirs retain this residual oil below the water-oil contact but within the water transition zones due to geological tilting and/or natural water drive, which cannot be produced from primary oil production or water flooding.

In considering further the macroscopic sweep efficiency whereby the permeability distribution relates to the rate at which oil can be produced, which is exceedingly important to the success of oil recovery, carbon dioxide increases the permeability of sandstone-based oil reservoirs by about 5-15%, and carbonate-based oil reservoirs by about 5-75%. On the other hand, those naturally water-wet oil-bearing carbonate formations, which are the minority and neither ideal nor favorable for oil recovery because they restrict the flow of fluids other than water, could be indeed useful for trapping carbon dioxide in the pore spaces to prevent it from migrating and/or escaping. Regardless of whether global warming is real or not, an imposed carbon tax on producers and polluters will be sooner or later a reality.

Yet, in considering further the microscopic sweep efficiency whereby carbon dioxide drive leads to oil expulsion, the factors of fluid immiscibility and interfacial forces come into play. Due to favorable properties [critical temperature ($T_C$): 31° C.; critical pressure ($p_C$): 73.8 bar; and acentric factor (ω): 0.239], carbon dioxide would develop miscible displacement conditions for hydrocarbons when a reservoir's pressure is within the $p_C$ of water (221 bar) at typical reservoir's temperatures (80-150° C.), whereas other non-hydrocarbon gases such as nitrogen, hydrogen, carbon monoxide or flue gas would not develop such miscibility conditions unless the reservoir's pressure is within 300 bar. Carbon dioxide is not only actually a dense gas at ambient conditions, but also exhibits a "liquid like" density at a typical reservoir's pressure range (150-250 bar), which would be in the order of 0.35-0.59 g/cm$^3$ at 100° C. This is much higher than the densities of hydrocarbon gases (e.g., methane) or non-hydrocarbon gases, and is closer to the density of typical crude oil (Table 1) than such gases. Similarly, the solubility of carbon dioxide in both water and oil increases, but more so in oil, at such reservoir's conditions, wherein a higher solubility in water may slightly increase the viscosity of carbon dioxide whereas a higher solubility in oil may slightly decrease the viscosity of oil. However, lower reservoir pressures would develop less miscibility conditions, but oil swelling by carbon dioxide would still be a key mechanism for oil displacement. Here, potential gravity separation between carbon dioxide and oil due to density and viscosity differences, which are far less than the differences between oil and other hydrocarbon and non-hydrocarbon gases, could be overridden by alternating injection of water (or hot water) and carbon dioxide (WAG).

By using de-oxygenated as well as de-sulfated seawater or sulfate-depleted brine from seawater desalination plants, the generation of hydrogen sulfide would be eliminated from the start. This not only helps preventing reservoir souring, but also helps preventing corrosion, especially stress corrosion cracking (SCC), since the injection of carbon dioxide would produce the weak carbonic acid, which means a much less amount of hydrogen sulfide is required to lower the pH to a level that triggers SCC, thereby the removal of sulfate from source water is essential.

The above presented emphasis on the importance of selecting and treating appropriate displacing fluids at surface facilities as related to the displacement of oil from subsurface formations immediately points to the peculiar nature of the problem of treating the produced wet oil at surface facilities. The basic reason for failure to highly improve oil recovery essentially rests on fluid immiscibility and interfacial forces. All attempts to improve oil recovery aim at conversing such factors (increasing miscibility and reducing interfacial tension), thereby producing wet oil emulsions, wherein the latter may be kinetically stable macro-emulsions (a size range of about 0.1-5 $\mu$m with an average of 1-2 $\mu$m), thermodynamically stable micellar or micro-emulsions (a size range of about 5-50 nm), or only kinetically stable micro-emulsions (a size range of about 20-100 nm). The followed approach, as still remain, to segregate wet oil emulsions into oil and water at surface facilities is to re-reverse the already reversed and produced emulsions by IOR or EOR; that is re-establishing fluid immiscibility and interfacial forces essentially to their original state as they were in oil-bearing formations before applying IOR or EOR methods.

As summarized in FIGS. 1 and 2, the essential purpose of IOR or EOR methods in extracting trapped, residual or immobile oil from a reservoir formation is to help mobilizing and breaking down droplets of the oil phase. Yet, nearly no method presented itself of mobilizing and dispersing oil droplets in an emulsion, without changing conditions in the reservoir to such an extent that the results could be nearly valueless, irreversibly damaging to the reservoir formation, and/or combinations thereof As such, implementation of IOR or EOR methods would only be logically expected to occur if: (1) their ramifications were fully understood; (2) they were deemed to be competitive with alternative investments; and (3) they were based on financial returns addressing any economic eventuality; from "boom or bust" to "constrained growth" during the anticipated life span of operating facilities.

On the other hand, FIG. 7A or 7B may depict a typical wet oil gathering center (GC). Here, the essential purpose of processing a produced wet oil emulsion in a GC is to reform droplets of a dispersed phase by given the emulsion sufficient time (rest) to roughly separate out naturally. It is neither practical to wait indefinitely for nature to do the de-mixing of the liquid phases; nor actually effective to reach near complete de-mixing of the liquid phases; nor economical to have a multitude of separation steps in a GC or shutting down oil wells due to an excessive water cut that the GC cannot keeps up with it; nor environmentally sounds to keep generating oily waste streams, even after conducting a multitude of separation steps within the GC, yet such streams still require suitable disposal paths or treatment. An under construction plant to treat 100,000 barrels of produced water, which essentially comprises skim tanks and nutshell filters (FIG. 7A or 7B; W1 and W3), at a cost of over one billion dollars; In other words, the capital cost of one barrel of produced water is $10,000. Note, here, the purpose of this plant is to treat only the already separated water phase (produced water) at an abnormal capital cost.

One might then ask why extracted and readily dispersed (stable; whether kinetically, thermodynamically or both) wet oil emulsions by extremely complex and expensive IOR and EOR methods from oil-bearing formations are re-inverted back to instable emulsions at surface facilities to re-separate oil from water? One might further ask why the complexity, redundancy and high expenditures of wet oil gathering centers are not immediately alarming? It is one of the strange situations when the very purpose of a forward approach (IOR or EOR) is immediately reversed to an equal degree by the purpose of a backward approach (GC), in a twist of combinations that seem historically inextricable from each other.

THE OBJECTIVES OF THE INVENTION

It is then interesting to consider the logic of de-mixing oil and water phases directly simultaneously from produced stable wet oil emulsions. Therefore, the main objective of this invention is to provide membranes that can be extremely water non-wet and extremely oil wet to treat such stable emulsions. The applications of such membranes also naturally include treatment of de-stabilized wet oil emulsions. There would thus be a unity to which true opposites apply; a "both/and" (treatment of both stable and instable wet oil emulsions) instead of an "either/or".

BRIEF SUMMARY OF THE INVENTION

The present invention generally provides methods for preparing a material for casting a flat-sheet, extruding a solid-fiber, and/or extruding a hollow-fiber utilizing an aqueous amine solution as an effective solvent for phase inverting the material to form a crystalline polymorph structure.

This invention is not restricted to use in connection with one particular application. This invention can be used, in general, to simultaneously de-mix oil from water in a wet oil emulsion, whether the emulsion are stable or instable; independently de-oil an oil-in-water (O/W) emulsion and/or stream; and/or independently de-water a water-in-oil (W/O) emulsion and/or stream. Further objects, novel features, and advantages of the subject invention will be apparent to those skilled in the art upon examining the accompanying drawings and upon reading the following description of the preferred embodiments, or may be learned by practice of the invention. Those of ordinary skills in the art will appreciate that the subject invention can be modified or adapted in a variety of ways. All such modifications or adaptions, which fall within the scope of the appended claims, are intended to be covered.

DESCRIPTION OF THE PREFERRED EMBODIMENT

The Relative Wettability

Figure 1:
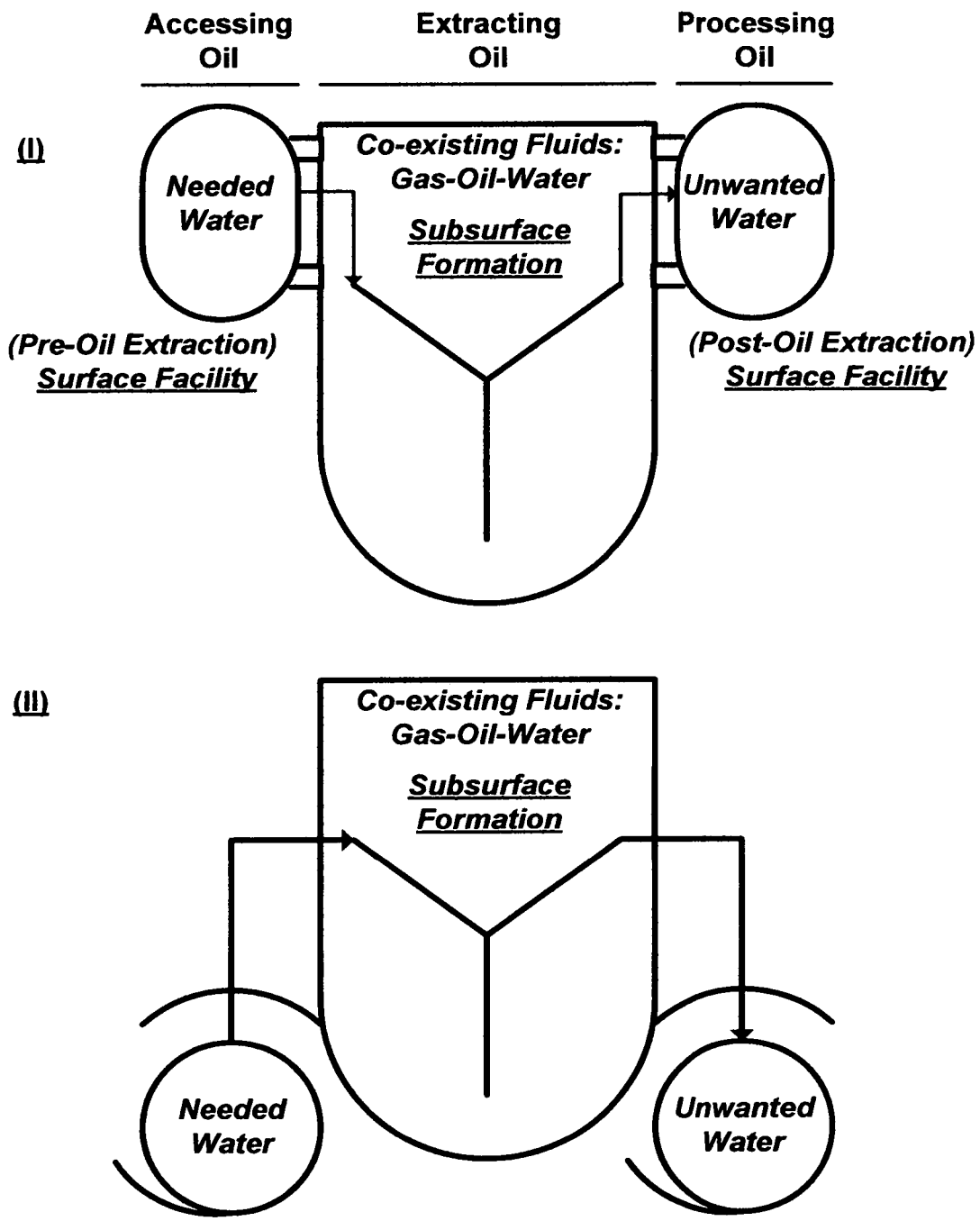
FIG. 1 illustrates the role of water in accessing oil, extracting oil, and processing produced oil.

Phase inversion has been appeared in a multitude of forms, but all have been characterized by specific controls of composition (e.g., solubility, pH, etc.), temperature, pressure, and/or combinations thereof. Phase inversion is also used as an enabling step in the work-up or break-up of a reaction or an interaction, before final displacement of a phase, before final casting or extruding of a phase, or before final separation/purification of a phase or a product by distillation, filtration, sublimation, precipitation, crystallization, adsorption, absorption, among others.

Precipitation, for example, involves phase inversion, wherein a soluble species in a primary solvent is transformed into an insoluble state either by decreasing its solubility in the primary solvent or by extracting the primary solvent from the soluble species. One form is selective precipitation, which stands on inducing a secondary solvent to a solution to reduce the solubility of the species by binding the primary solvent to the secondary solvent. Of course, the identity of the primary solvent, the nature and concentration of the soluble species and the conditions under which phase inversion is conducted come into play, but the effectiveness resides with the identity and modification of the secondary solvent.

The induction of an amine solvent [e.g., methylamine (ME), ethylamine (EA), isopropylamine (IPA), propylamine (PA), dimethylamine (DMA), diethylamine (DEA), diisopropylamine (DIPA) and dipropylamine (DPA)] has been innovatively used by the inventor as a secondary solvent in a liquid phase precipitation as well as a vapor (compressed and/or flashed) phase precipitation with multiple variants to effectively selectively precipitate targeted: (1) inorganic species; and/or (2) ionizable organics (e.g., carboxylic salts, phenol salts, etc.) and inorganics (e.g., carbonates, sulfides, etc.) from aqueous streams. The yields of these precipitation variants are remarkable particularly, for example, in: (1) de-scaling saline streams; (2) aiding the de-oiling of saline streams; (3) de-mixing the amphiphilic portion of wet oil; and (4) de-folding the amphiphilic nature of proteins in wastewater to ultimately separate endotoxins with dense gas (e.g., carbon dioxide).

The key factors in these selective precipitation variants are that the amine solvent (the secondary solvent) is miscible with water (the primary solvent), whereas: (1) the solubility of the targeted inorganic species is very limited in the amine solvent; and/or (2) the ionizablity of targeted organic and inorganic species in the presence of the amine solvent becomes crossover (below or above) the neutral pH. The latter has been further modified by, for example, transforming the amine solvent into an anionated form by reacting it with acid, since these amine solvents are weak bases that undergo reversible reactions with water or acid to form weak acids, and then regenerating the amine solvent (a weak base) from its anionated form by an external hydroxide source (an inorganic or organic). The external hydroxide source serves, in turn, a multitude of purposes including restoring the amine solvent to its weak basic form to serve a further purpose, facilitating the recovery of the amine solvent for reuse, and using the external hydroxide source, itself, in a further step (e.g., de-scaling). This pH switchability of the amine solvent displaces selectively the ionization equilibrium of reactive species towards either their molecular forms or ionized states. It displaces the ionization equilibrium of, for example, carboxylic acids and phenols in wet oil towards their molecular forms under an acidic condition, which are essentially hydrophobic instead of their amphiphilic ionized states under about neutral and basic conditions. The opposite goes for naturally occurring basic constituents in wet oil. The pH switchability thus leads to two low values of wet oil interfacial tension; one at either end of the pH scale.

As such, the inventor has innovatively exploited the competition between targeted inorganic species and/or ionizable species and amine molecules on the water molecules by: (1) the "amining out" step wherein targeted inorganic species are precipitated whereas the amine solvent remains in solution; (2) "salting out" step wherein an amine solvent is separated while inorganic species remains in the solution; (3) the "ionizing out" step wherein acidic and basic ionizable organic and inorganic species are reversibly selectively displaced by dissolving them, precipitating them, and/or converting them to a gaseous state whereas the amine solvent remains in solution; (4) the "wetting out" step wherein a membrane's pores are selectively filled with a liquid phase or fluid; and/or (5) the standalone, sequential or simultaneous occurrence of such described steps. The fundamental thermodynamic frameworks for the precipitation of ionic species in mixed solvents have also been established [Bader; 1998 and 1999].

Phase inversion by inducing a secondary solvent has also long been used, among other concepts (e.g., melting, sintering, etching, stretching, surface coating, surface grafting, etc.), to prepare membranes. In a conventional polymer phase inversion process comprising three components, a polymer is dissolved in a primary solvent to form a homogenous solution. The polymer is then precipitated from the homogenous solution by a secondary solvent, wherein the secondary solvent is soluble in the primary solvent while the polymer is nearly insoluble in the secondary solvent. During phase de-mixing, the solution is cast (e.g., flat sheet) or extruded (e.g., hollow fiber, tubular, etc.) into a desired shape, wherein the polymer-rich phase solidifies into a membrane matrix whereas the polymer-poor phase develops into pores within the membrane. The thermodynamic principle for the precipitation of polymeric species in mixed solvents has been delineated [e.g., Hsu and Prausnitz, 1974]. In different variants of inducing a secondary solvent, polymer phase inversion by precipitation has been used to prepare membranes. The basic principles of these variants are briefly summarized in the following paragraph [e.g., Ferry, 1936].

A membrane film was historically practically prepared by subjecting a polymer dissolved in a primary solvent to vapor of a secondary solvent to prevent the evaporation of the primary solvent from the formed film but allow the vapor of the secondary solvent to diffuse into the formed film, thereby forming a porous membrane without a top layer. Here, the secondary solvent is more volatile than the primary solvent. In another variant, a polymer is dissolved in mixed primary and secondary solvents, wherein the primary solvent is more volatile than the secondary solvent, whereby increasing the content of the polymer and secondary solvent by evaporating the primary solvent, which eventually leads to polymer precipitation resulting in forming a skinned membrane. In a further variant, a polymer is dissolved in a primary solvent, and the homogenous solution is cast on a support or deposited on a substrate by dip coating or spraying, followed by allowing the primary solvent to evaporate in an inert atmosphere (e.g., nitrogen or air) to expel the vapor of the primary solvent, thereby forming a dense homogenous membrane. Phase inversion by these evaporative precipitation variants has been further adapted to prepare membranes by liquid-phase precipitation, wherein a homogenous solution comprising a polymer and a primary solvent is directly immersed in a bath containing a secondary solvent [e.g., Loeb and Sourirajan, 1963]. The latter made the practical use of reverse osmosis (RO) hydrophilic membranes to desalinate seawater possible, which was a landmark contribution of United States to the desalination field. Membrane fabrications are essentially extensions of such methods; all which involve melting or dissolving a polymer, casting or extruding the melted or dissolved polymer, and precipitating the polymer by phase inversion; but again the effectiveness resides with the identity and modification of the secondary solvent.

Figure 2:
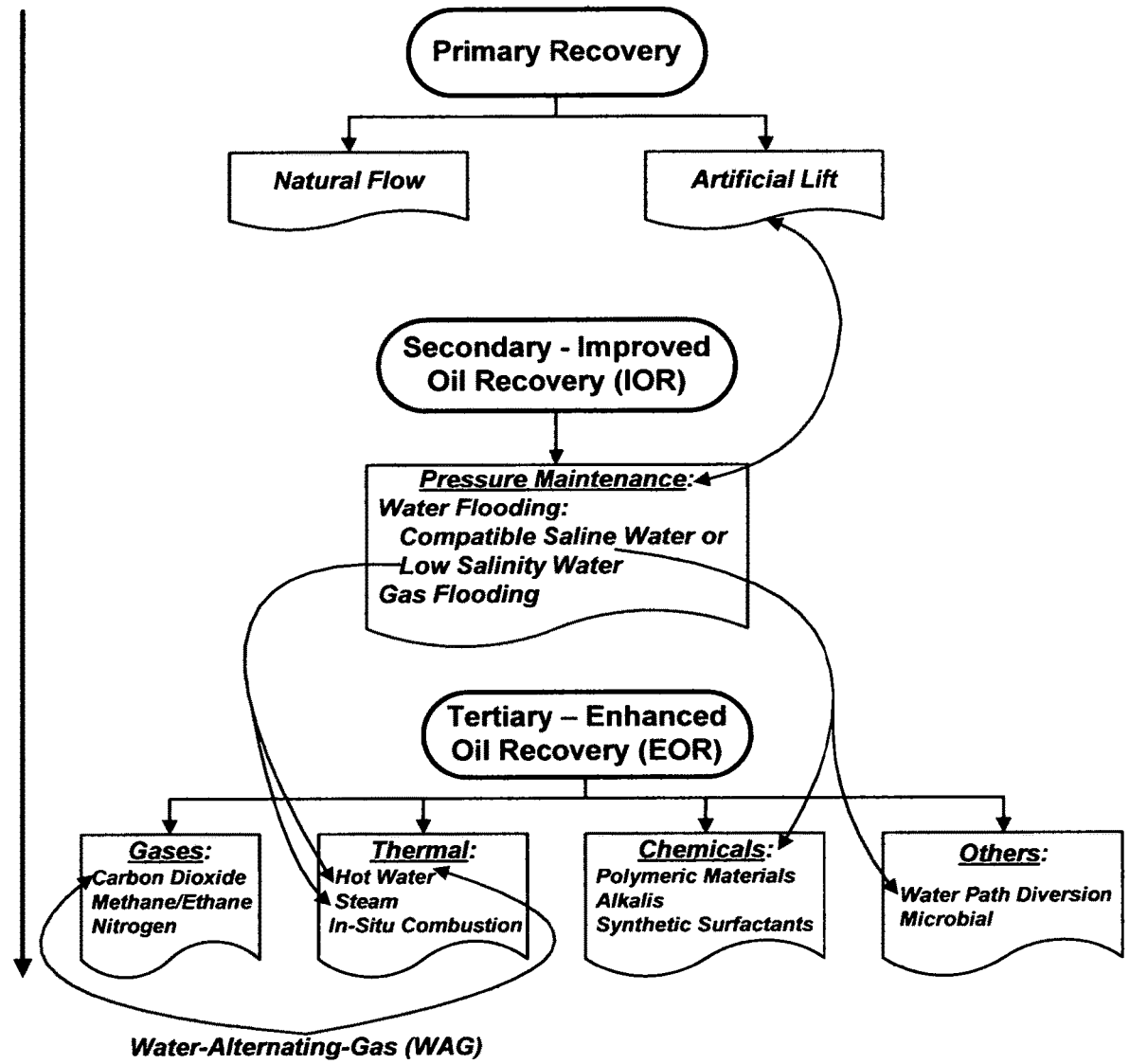
FIG. 2 illustrates the known methods to recover oil at different stages from oil-bearing formations.
Figure 3:
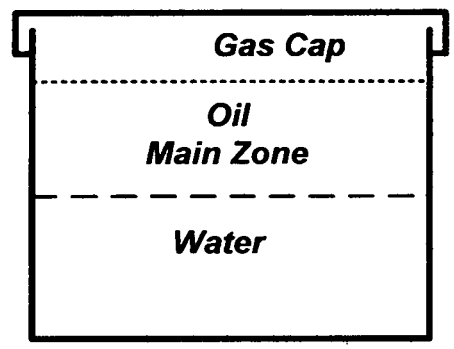
FIG. 3 illustrates fluid zones in an oil-bearing reservoir.
Figure 3:
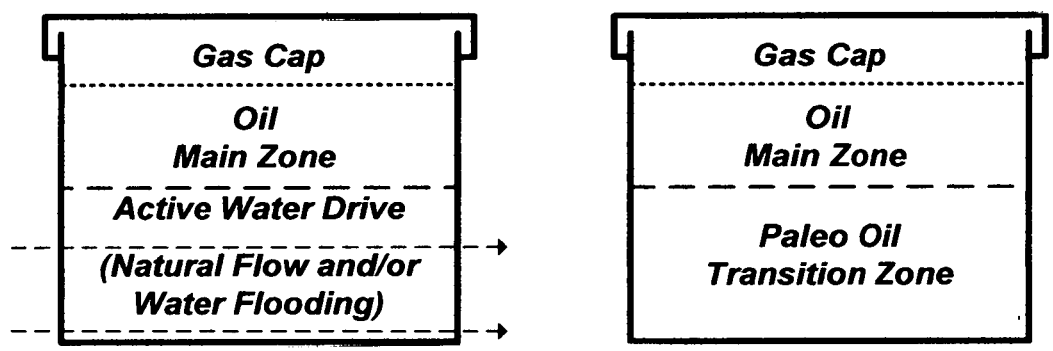
Figure 4:
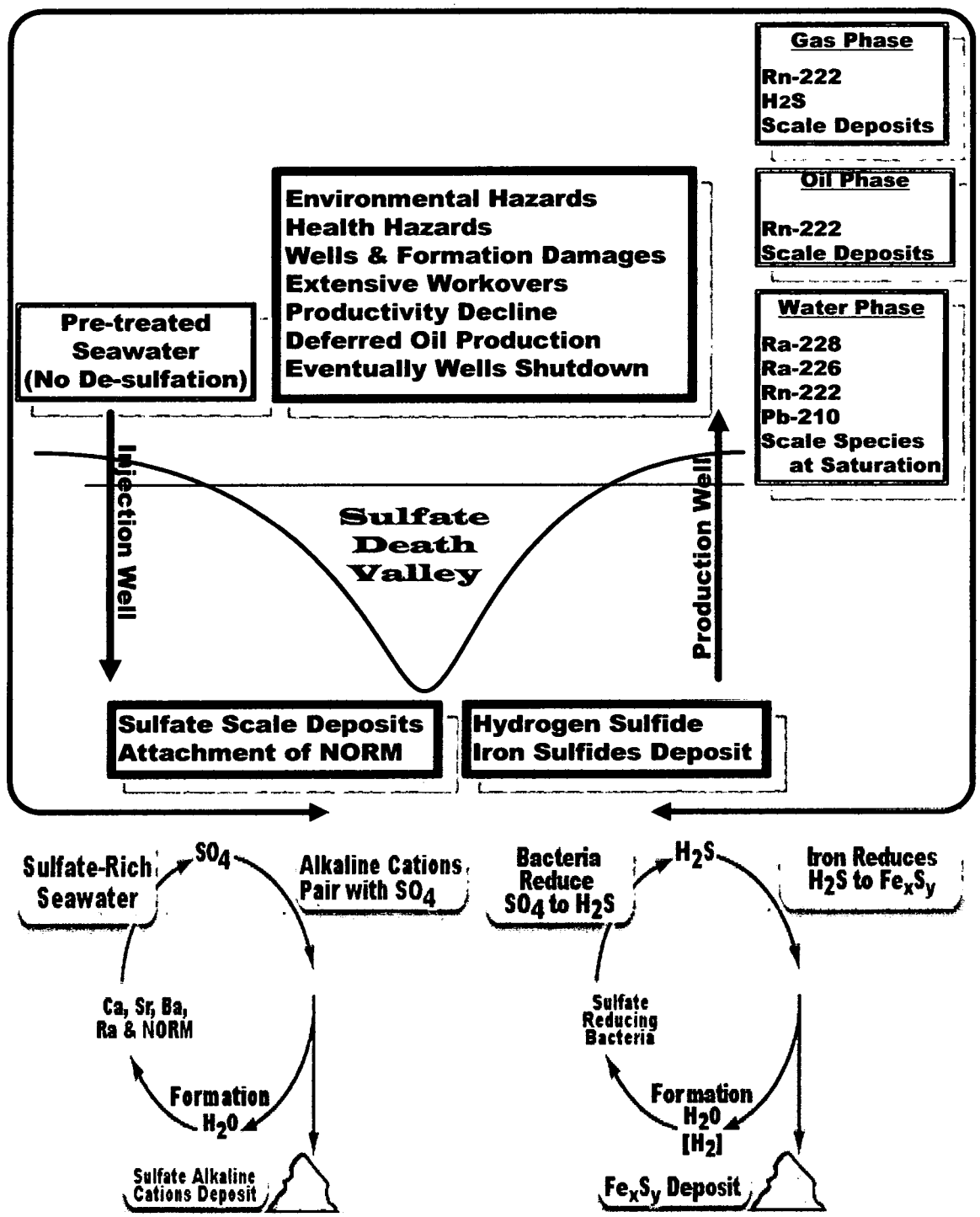
FIG. 4 illustrates the negative aspects of injecting a sulfate-rich saline stream such as seawater.
Figure 5:
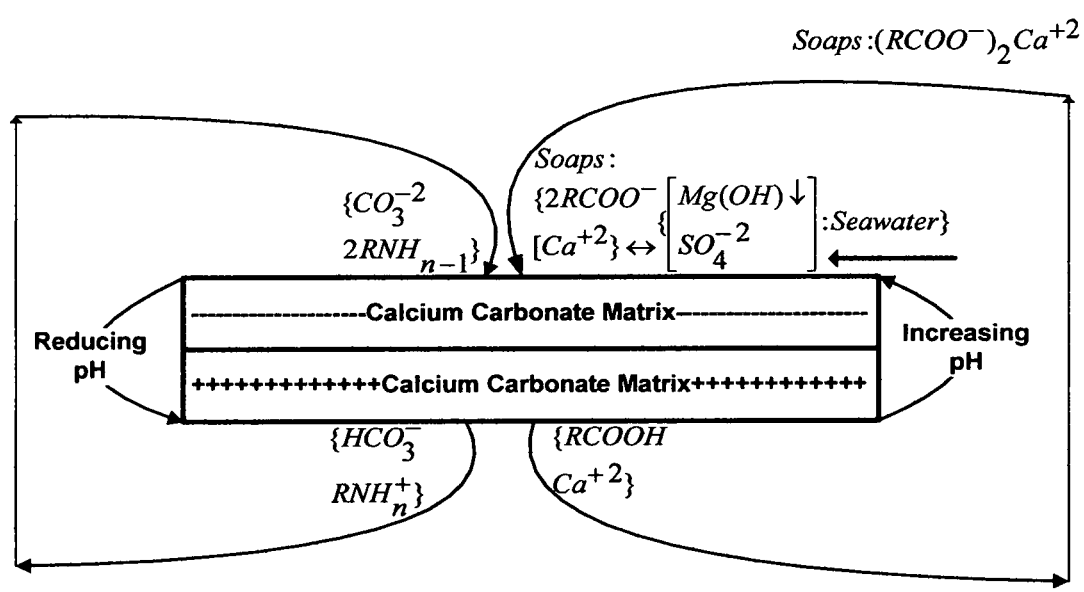
FIG. 5 illustrates the negative aspects of increasing the pH and injecting a sulfate-rich saline stream on a carbonate matrix.
Figure 6:
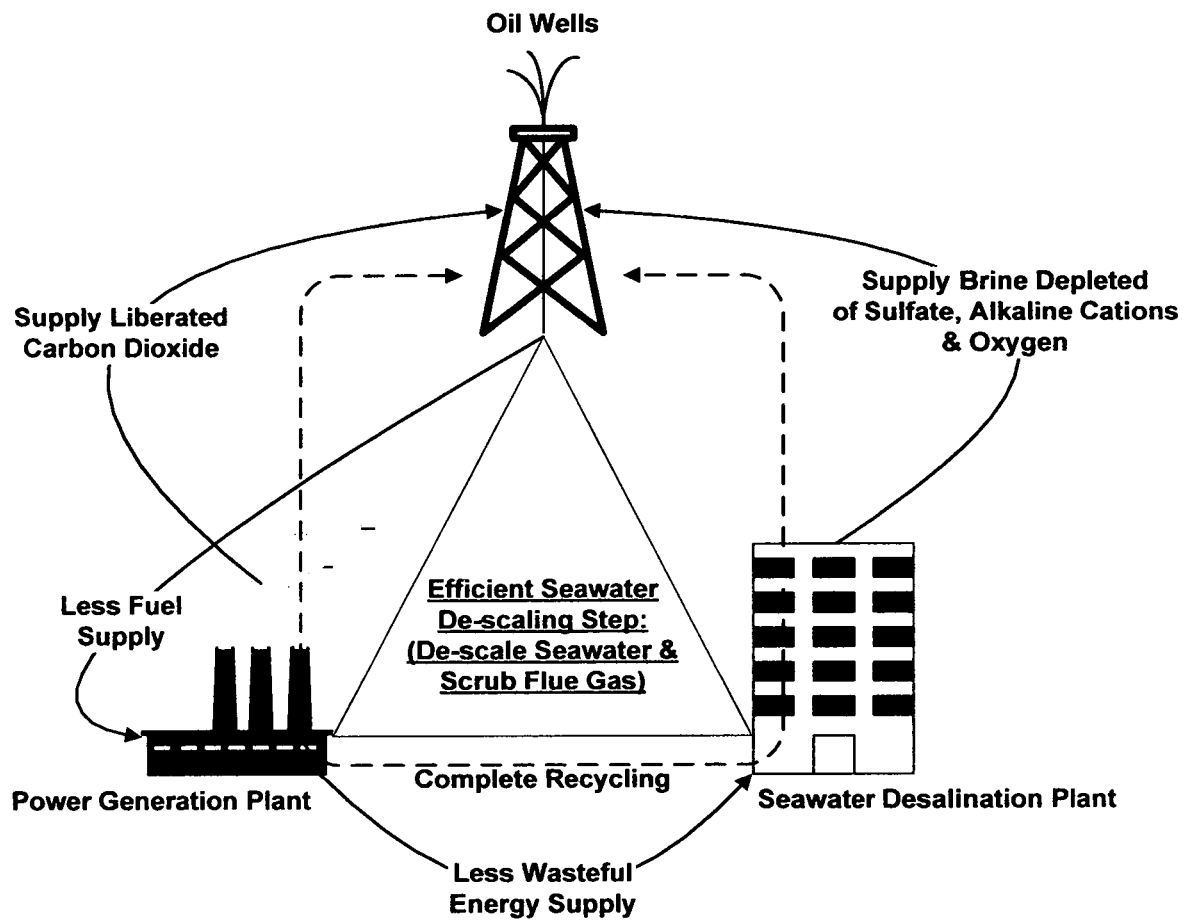
FIG. 6 illustrates, for example, the much needed viable integration of oil production with power-potable water co-production.

Emulsion inversion has been hallowed through the entire history of wet oil phase mixing and de-mixing. A stable emulsion is generated by dispersing one phase into a primary phase with a sought out reduced interfacial tension to minimize their tendency to separate through an IOR or EOR method under a given set of conditions (FIG. 2), thereby mobilizing it from an oil-bearing formation to a surface facility. The produced stable wet oil emulsion is then de-stabilized (reconverted to macro-emulsion) in a GC (e.g., FIG. 7A) by adding additives (e.g., de-emulsifiers) and trapping in a vessel (e.g., a wet oil gravity tank) for a given duration of time to break down the primary phase into two liquid phases (de-mixing); one is richer and the other one is poorer in the dispersed phase of the primary phase. Here, the separation mechanism may be combinations of coalescence, phase inversion, and ripening under the influence of gravity for a given period of time. Thus, neither the water phase (O/W stream) from the wet oil gravity tank is separated as a readily de-oiled phase nor is the oil phase (W/O stream) separated as a readily de-watered phase.

It follows that de-watering the oil phase from the wet oil gravity tank (e.g., FIG. 7A) requires further de-hydration (e.g., removal of water content by heat, electricity, additives, and combinations thereof), and washing (e.g., removal of salt content by potable water or a low salinity water source) to produce a dry oil phase. However, heat vaporizes the light ends of the oil phase, unless other means are provided to conserve them, which reduces the API gravity and volume of the oil phase (e.g., a gravity loss of 1° API causes a volume loss of about 2.8% on 30° API oil). It thus is generally the practice to limit the heating temperature to <70° C. and use a large dehydration vessel or stage two dehydration vessels, than to lose API gravity and volume of the oil phase through excessive heating. Electricity can be used in place of, or in addition to, heat since an electrical field polarizes the dispersed small water droplets in the W/O stream, thereby stretching their surfaces so that such droplets unite more readily. But the electric field cannot tolerate solids, which necessitates the use of additives.

More redundantly, de-oiling the water phase from the wet oil gravity tank (e.g., FIG. 7A) requires a series of steps (routinely three) arranged consecutively based on the size distribution of entrained oil droplets in the water phase. A skim tank may be used as a first de-oiling step to separate the bulk of oil droplets (e.g. >100 μm) from the water phase. Here, the separation mechanism may be combinations of sedimentation, creaming and aggregation under the influence of gravity, difference in densities and attraction energy of oil droplets. The gravity force may be replaced by centrifugal forces, thereby replacing a skim tank by a cyclone or a centrifuge to eliminate retention time. Flotation may be used as a second de-oiling step to remove smaller suspended oil droplets (e.g., 15-100 μm). Flotation, as a separation mechanism, is allied to creaming more than sedimentation, in which gas bubbles are attached to suspended oil droplets so that they will float (creaming) rather than sink (sedimentation). Other separation mechanisms for finer oil droplets (e.g., roughly within 15 μm) including adsorption [e.g., activated carbon, nutshell, manganese dioxide, etc.], filtration [e.g., microfiltration (MF) or ultrafiltration (UF)], or extraction [e.g., liquid solvents or polymers] may be used as a polishing step. However, none of these de-oiling steps of the water phase from a wet oil gravity tank (e.g., FIG. 7A) or a 3-phase separator (e.g., FIG. 7B), individually or collectively, may be capable of efficiently removing the total oil content (TOC). Thus, a considerable portion of TOC may remain in the treated water phase (e.g. produced water) as a contributor for ionized scale, toxicity, carcinogenicity, and/or combinations thereof. In addition, each of such de-oiling steps produces oil-rich reject streams (e.g., cyclone, centrifuge, MF, and UF), oil-rich stripped streams (e.g., extraction by polymers), or oil-rich exhausted materials (e.g., activated carbon, nutshell, and manganese dioxide); all of which require partial recycling, backwashing, disposal paths, more treatment, media replacement, and/or combinations thereof.

It should be noted that TOC is the sum of dispersed oil and dissolved oil in a water phase, since the oil content in the water phase may be dispersed, dissolved, and combinations thereof, and the proportions of dispersed and dissolved oil in the water phase may vary considerably with the nature crude oil and the recovery method of wet oil. EPA Method 1664 is the officially approved method in the U.S. for measuring TOC. It should be also noted that de-oiling of the water phase (an O/W stream) may be severely truncated to one step (e.g., skim tanks) or two steps (e.g., skim tanks and nutshell filters), especially when the water phase is discharged into disposal wells. It should be further noted that as water cuts increase in produced wet oil emulsions, the two-phase (vapor-liquids) separators may be retrofitted into three-phase separators (vapor-liquid-liquid) in a wet oil gathering center, as may be shown in FIG. 7B, to separately produce W/O streams and O/W streams; thereby presumably reducing the load on de-hydrators and de-salters to improve their separation efficiency, and avoiding installing additional water traps (more wet oil gravity tanks) to handle the surge in the water cuts. Here, the water cut in wet oil is the ratio of the water volume to the volume of total produced liquids (water and oil).

As can be seen, wet oil phase de-mixing in GCs (e.g., FIGS. 7A and 7B) is so ill-utilized that it is worthwhile re-emphasizing three factors. The first factor is that in wet oil extraction and mobilization from a subsurface formation, access is required to the liquid phases, which are not dispersible in one another. Such an access is arranged by emulsifying one phase in the other via an IOR and/or an EOR method under certain conditions. The necessity of de-stabilizing the emulsion in a GC to de-mix the liquid phases, after completing the stabilization and mobilization of the emulsion from oil-bearing formations, tremendously detracts, both economically and environmentally, from the useful utility of this approach. This is the crux of the problem, wherein an instable emulsion leads to a dual poor phase separation problem. Instead, a solution should be intuitively focused on directly subjecting a readily produced stable emulsion to a separation mechanism that efficiently separates stable dispersed fine droplets of one phase from the other phase.

The second factor is that a produced wet oil emulsion, depending on it is water cut and viscosity, could be a W/O emulsion or an O/W emulsion. The solution should be applicable to "both/and" of these types of antagonistic emulsions, instead of "either/or".

The third factor is that, after de-stabilizing a produced stable wet oil emulsion by adding a de-emulsifier and arresting in a wet oil gravity tank, where it is essentially consecutively phase inverted into a W/O stream and an O/W stream. Each stream is then withdrawn separately from the wet oil gravity tank, and each withdrawn stream is independently subjected to a multitude of separation steps. It is much more expensive to incur the extra costs of de-watering the oil phase and de-oiling the water phase, independent of each other. Yet, a de-watered oil phase frequently fails to meet dry oil export specifications, and a de-oiled water phase often does not meet environmental discharge regulations. Contrary to this practice, de-watering an oil phase and de-oiling a water phase are synonymous; thereby their de-mixing should be done simultaneously by a unison efficient method.

The importance of these factors also reveals that, in the absence of "what possibly" a whole unison simpler method to de-mix liquid phases of a wet oil emulsion, tackling a segmented element of the phase separation problems in a wet oil GC is not necessarily a significant advantage, even with an efficient segmented separation step, because the focus commensurate with "what is" shaped as a local problem within the GC; not the global shape of the problem itself (the nature of a produced wet oil emulsion).

Taking these factors together and recognizing the actual shape of wet oil phase de-mixing problem, it is feasible in principle that a simpler solution may be intuited both economically and environmentally. The inventor believes that this simple solution would evolve from a properly engineered membrane step since it: (1) has an essential simplicity of structure in that it consists inherently only of a compact housing envelop and a type of a low pressure separating surface preferably performing only one function between two fluids; and (2) could provide that treatment of readily produced stable wet oil emulsions where it could not be provided by a conventional massive GC. It follows also that there will be no incentive to move to such a treatment unless the combination of capital cost and membrane replacement cost is favorable. The whole point, again, is that to obtain a relatively inexpensive satisfactory membrane on which to effect the phase separation is one thing; to engineer an inexpensive superior membrane into all the complexity of wet oil phase de-mixing for a reliable operation is another. The main drawback of membrane fabrications so far is the use of large amounts of materials (polymers and solvents), which may be environmentally undesirable and/or capital intensive. Commercially available membranes are thus made with a few types of cheaper materials even thought their performance is not convincing. From this point of view, it is certain that whoever succeeds in directly treating stable wet oil emulsions by membranes in the future will either utilize a promising combination of materials through experience in wet oil, or will have made arrangements to acquire such experience.

Relevant membranes may be generally classified into two main types: (1) those which filtrate oil suspensions from water (water-wet) by allowing water to pass through the membrane but rejecting oil suspensions; and (2) those which separate the water phase from the oil phase (oil-wet) by allowing the oil phase to pass through the membrane but rejecting the water phase. Water-wet membranes and oil-wet membranes are not entirely different in the sense that they are the two ends of a continuum. But the defining variable in the continuum is the separation mechanism relative to the phase subjected to separation from the other as related to the surface wetted. The point to be noted here is that all filtration methods are separations, but not all separation methods involve filtration. Filtration is a separation mechanism in which a suspension of liquid droplets or solid particles in a primary fluid phase, either liquid or gas, is filtrated by passage through a restrictive barrier (the filter medium), such that some species of the suspension are retained on the barrier, and the fluid passes through it. The first type of membrane is filtration; whereas the second type is not strictly a direct measure of filterability, but wettability as it also relates to the roughness of the surface wetted, which defines the separation of a phase as whole.

Figure 7A:
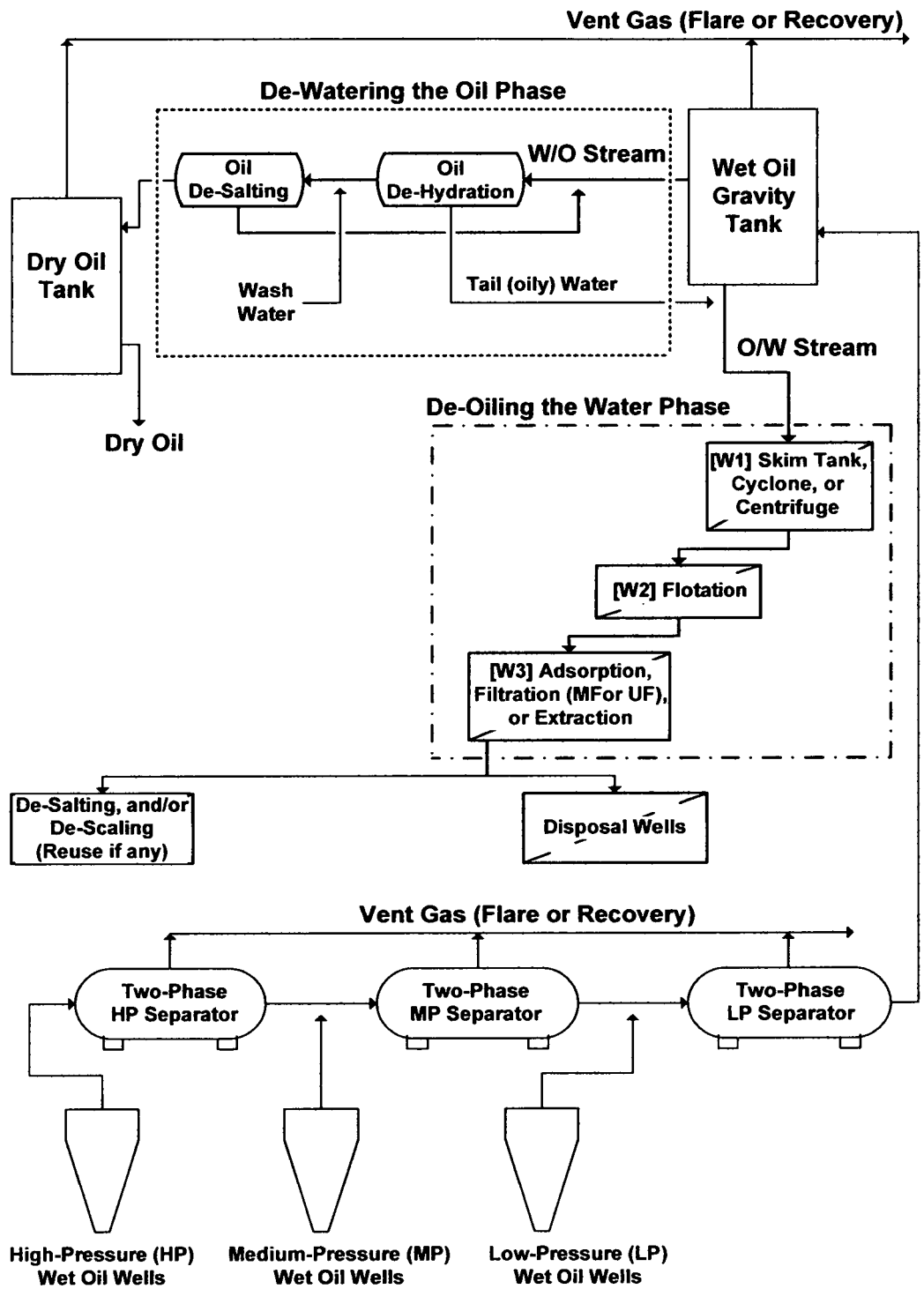
FIG. 7A illustrates a possible flow diagram for a wet oil gathering center (GC).
Figure 7B:
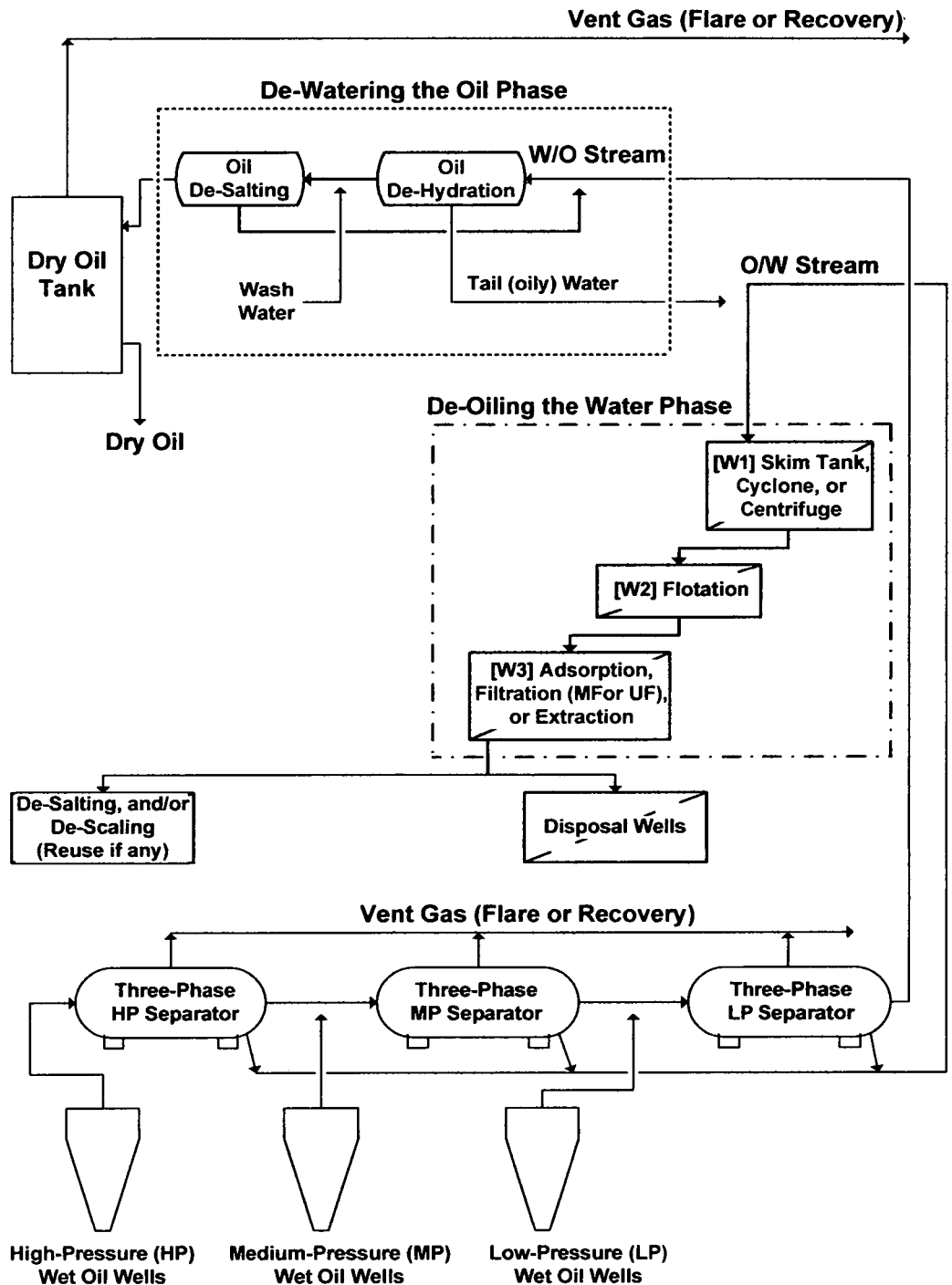
FIG. 7B illustrates another possible flow diagram for a GC.

It should therefore be apparent that that the first type cannot be applied when wet oil is a W/O emulsion since the primary phase is not water, and/or when the wet oil is a stable emulsion since the very finely dispersed droplets are not suspensions unless the pore sizes of the membrane [e.g., molecular weight cut-off (MWCO)] is much smaller than the finely dispersed droplets. Yet, even if the latter was made as a hyper-filter (e.g., RO), it would be impaired by the finely dispersed droplets and would not reject all of dissolved species [Bader and Jennings, 1993]. However, when the application of first type is stretched to its limited practical extent (an instable O/W emulsion); or when applied within its preferable limit (an O/W stream) as a polishing step (e.g., MF or UF as shown in FIGS. 7A and 7B), it produces an oil-rich phase (a reject stream) and a water-rich phase (a permeate stream), but neither of which is sufficiently depleted of the other phase. In both distinct situations (a W/O emulsion and an O/W emulsion), the first type does not have the basic advantage indicated in the second type, thereby it cannot hope to be used to an extent commensurate with the actual problem of wet oil de-mixing.

There is one other aspect that should be mentioned. No quantitative distinction so far is made between the quality of produced streams from the first type and second type of membranes, which is very far from being the case. In short, the second type of membranes can provide directly simultaneously from a de-stabled W/O or O/W emulsion or stream a de-watered oil phase that meets dry oil export specifications, and a de-oiled water phase that meets discharge limits [e.g., U.S. Pat. Nos. 8,915,301 and 10,441,898]. None of the first type of membranes can provide anything of this quality.

In as much as obvious the fundamental advantages indicated in the second type, the contrary notion is that the first type has a practical advantage over the second type. From here, I may now go on to examine this notion in more details. The contact angle is a measure of the wettability of a solid surface by a liquid droplet, which is the angle that forms between the solid surface and the tangent to the curve of the liquid droplet. The solid surface is wettable when the contact angle is between 0-90°, but it is not wettable when the contact angle is above 90°. Complete wetting is attainable when the contact angle approaches the ideal limit of 0°, whereas complete not wetting may be attained when the contact angle approaches the theoretical limit of 180°. Water is spontaneously rejected when a space between two hydrophobic surfaces becomes critically small, but water forms a stable thin boundary layer between two hydrophilic surfaces at a comparable space. This compact hydration layer is the foundation for the common notion that hydrophilic membrane surfaces provide better performance than hydrophobic membrane surfaces against organic, inorganic, and biological fouling. Yet, the most pronounced problem that hinders the applications of MF and UF hydrophilic membranes is precisely such fouling; thereby hampering their filtration efficiencies, reducing their permeate flows, and requiring repeated backwash and frequent membrane replacements.

Figure 8:
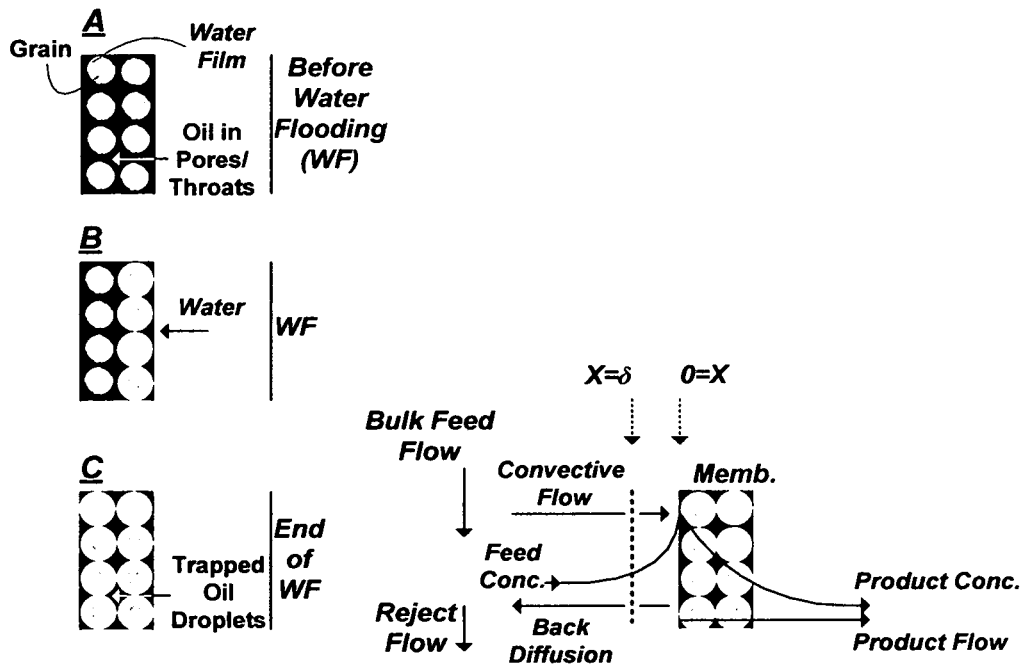
FIG. 8 illustrates water flooding through a water-wet oil-bearing formation matrix, flowing an O/W stream through a water-wet membrane, and the similarity between them in terms of water flooding and backwashing to mobilize trapped oil.
Figure 8:
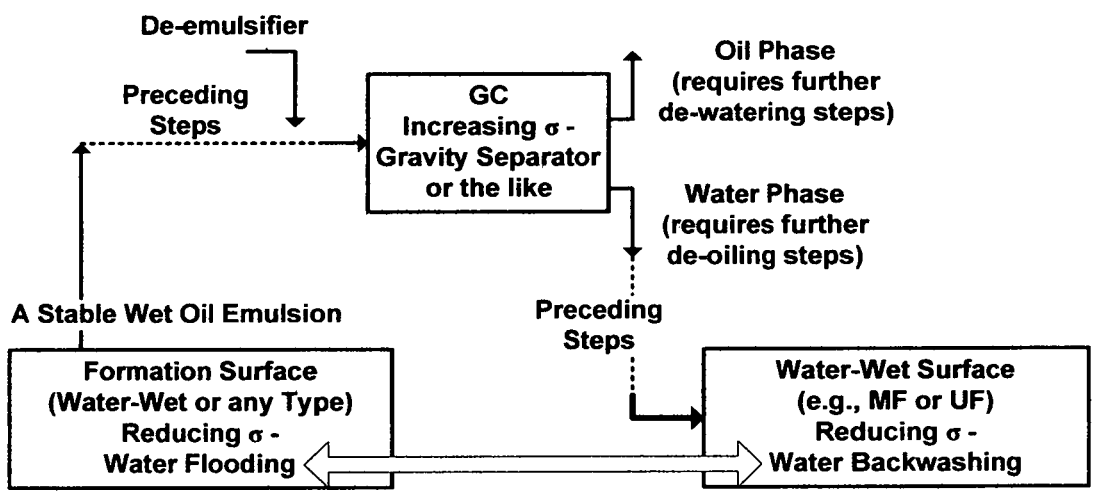

FIG. 8 depicts the similarity between a water-wet oil-bearing matrix (I) and a water-wet (hydrophilic) membrane (II). FIG. 8-I shows that water-wet formation grains are naturally coated with thin water films and the pores are saturated with oil (A), but the water films grow after initiating water flooding and their growths progress as water flooding progresses (B), until the continuity of water films is established whereas the continuity of oil droplets is vanished, which is the end of the usefulness of water flooding (C), thereby trapping residual oil in such water-wet formation matrices. That is to say that the continuity (or lack of continuity) of a phase is critical. FIG. 8-II shows how oil suspensions are filtered from a primary water phase by a water-wet membrane, which leads to not only trapping residual oil within the membrane pores and pore throats (in an essentially similar manner as shown in FIG. 8-I), but also growing an additional concentrated thin oil layer at the membrane surface due to the concentration polarization [e.g., Bader and Veenstra, 1996]. Both situations [FIG. 8—(I and II)] restrict flowability, where the former [FIG. 8-I] results in producing little oil after water breakthrough, and the latter [FIG. 8-II] results in sharply declining the permeate flux and membrane fouling. Applying higher pressures, diverting flow paths, and/or alternating between pressurizing and de-pressurizing cycles may be impractical or useless in both situations, but reducing the interfacial tension would reduce the oil droplet size thereby forming a finely dispersed stable emulsion, which is essential for oil displacement and mobility from an impaired formation matrix or membrane. In both situations, reduction of the interfacial tension may entail adding lye, acids, surface active agents (e.g., detergents; surfactants, etc.), disinfectants (e.g., sodium hypochlorite, chlorine, etc.), and/or combinations thereof to a suitable water stream for flooding or backwashing. Since a less experienced appraisal does not always realize to what extent these situations are in fact similar; endless publications, on they went, echoing the perils of oil trapping to a water-wet or an altered water-wet surface of each situation, but all failing in not realizing that the discontinuity of oil droplets by the growing water layers and/or films in both situations is the underlying result of water wettability. Looking at FIG. 8 (I and II), one can, too, imagine how a highly scale forming water stream such as 4-times sulfate enriched seawater or just seawater would further hinder (due to a multitude of undesirable interactions) the flowability of trapped oil from such surfaces, whether it was used for flooding an oil-bearing formation matrix or backwashing a membrane, and no matter what type of surface wettability was given to it. But more importantly, the less experienced appraisal does not always realize the cliched patterns of frequently inverting the "global" interfacial (adhesion) tension as simply visualized in FIG.

The most widely used materials, among others, as water-wet MF and UF membranes are polysulfone (PSU) and polyvinylidene difluoride (PVDF). PSU is a hydrophilic ($\theta$=70.5°; Table 3) amorphous glassy material with a structure comprising repeating chains ($[OC_6H_4OC_6H_4SO_2C_6H_4]_n$); thereby generally providing excellent thermal stability and ease of fabrication. PVDF is a border line hydrophobic ($\theta$=89°; Table 3) semi-crystalline polymer with a structure comprising repeating straight chains $[—CH_2—CF_2—]_n$; thereby providing thermal stability (to about 135° C.), pH stability (essentially over the entire range), excellent mechanical strength (elongation and tensile strength) and resistance to ozone and ultraviolet, but the fabrication of a modified water-wet PVDF membrane is difficult since the very characteristic that makes PVDF "non-water wet" also makes its modification to water-wet difficult. Nevertheless, the border line hydrophobicity of PVDF has been modified with hydrophilic additives [e.g., polyvinylpyrrolidone (PVP); polymethyl methacrylate (PMMA); polyethylene glycol (PEG); etc.], amphiphilic additives [e.g., surface active species such as surfactants and the like], or dispersed inorganic particles [e.g., $SiO_2$; $TiO_2$; $Al_2O_3$; $ZrO_2$; etc.] to fabricate a modified PVDF water-wet membrane. Such water-wet PSU and modified PVDF membranes are commonly considered as highly resistant to harsh operation and backwash conditions in MF and UF applications. However, PSU has poor resistance to aromatic hydrocarbons, halogenated hydrocarbons, alcohols, polar species, surfactants, and disinfecting or cleaning chemicals (e.g., sodium hypochlorite, etc.); wherein the combined effect, or the effect of the latter by itself over the entire pH range, destroys its hydrophilicity (e.g., chain scission) and deforms its pores. On the other hand, PVDF withstands aromatic hydrocarbons, halogenated hydrocarbons, alcohols, polar species, surfactants, organic acids, and acids; but it is known, as all hydrofluorocarbon polymers, to be vulnerable to strong base solutions such as lye (sodium hydroxide) or the hydroxide of other strong alkali cations since the following overall reaction may take place:

(5)

where X is $Na^+$, $Li^+$ or $K^+$. The hydrolysis of a full strength sodium hypochlorite (pH ~12) also generates sodium hydroxide and hypochlorous acid as follows:

(6a)

Here, the hypochlorous acid further forms the free radical hydroxyl and chlorine as may be given by the following overall reaction:

$$2HClO \rightarrow 2OH. + Cl_2 \quad (6b)$$

Flashing with a strong sodium hydroxide solution or bleaching with a full strength sodium hypochlorite solution oxidizes (sodium hydroxide) the surface layer of PVDF, whereas the free hydroxyl from the hydrolysis of sodium hypochlorite solutions destroys any bonded hydrophilic or amphiphilic additive (chain scission of weakest links) in an altered water-wet PVDF membrane by radical oxidation.

In order to protect a membrane from a biological growth during the treatment of water streams and/or to restore a membrane after declining performance, disinfection and/or backwashing are routinely performed using chemical agents. Among such agents, sodium hypochlorite is the most widely used since it can be generated on-site at a low cost and can satisfy both functions as a disinfectant and a cleaning agent; wherein for the latter, the chemistry of sodium hypochlorite allows for pH variations from acidic to basic conditions. Sodium hypochlorite decomposes into ions (e.g., Na+, OH−, Cl−, and ClO−) and mainly OH. radicals. The OH. radicals are very reactive and very small in size, thereby easily diffusing through materials especially hydrophilic ones. Of course, the distribution of the ionic and free radical species upon the hydrolysis of sodium hypochlorite depends on the pH, wherein the free radicals are dominant at pH values below 6, less dominant at about neutral pH, and vanished altogether at pH values above 9. As such, the impact of sodium hypochlorite solutions on such water-wet membranes is essentially destructing their hydrophilicity. Yet, it has been practically observed by the inventor (and may be others) that such a hydrophilicity destruction actually temporarily reduces the fouling tendency of such membranes since it also reduces the porosity (even though it reduces the permeability), thereby reducing the amount of trapped fouling species within the pores of such water-wet membranes (e.g., MF or UF); but it is a short-lived period, after which pore inner walls and surfaces start deteriorating long before reaching the nominal life expectancy of the membrane.

This demonstrates, in an essentially similar manner to water-wet oil-bearing formations, that water wettability of a surface neither correlates with preventing oil from flowing into it, nor does correlate with allowing oil to flow out of it. In other words, a water-wet surface allows some oil to permeate through it, but traps most of the permeated oil within it. This also affirms that the notion of inverting not water-wet oil-bearing formations or materials to water-wet is useless.

Precedent surface modification methods for polytetrafluoroethylene (PTFE) to make it bondable to other materials by reacting the surface with suitable fluid cation/metal reactants before bonding were developed in the 1950s [U.S. Pat. No. 2,789,063]. The methods were based on replacing fluorine in the surface layer of PTFE with the cation or metal, thereby making the surface more hydrophilic. Alkali cations (e.g., sodium), alkaline earth cations (e.g., calcium), and transition metals (e.g., manganese or zinc) were used to react with PTFE surfaces at high temperatures [e.g., above the melting point of the cation or metal, but below the melting point of PTFE (315° C.)] or heating the PTFE material as it emerged from a liquid reacting bath at high temperatures (e.g., 220° C.); wherein the cation or metal is a vapor, a cation or metal hydride, or in non-aqueous liquid ammonia or methylamine. It should also be noted that, as all hydroflurocarbon polymers, pyrolysis at high temperatures also degrades PVDF by the evolution of a large amount of hydrogen fluoride (HF). This large loss of HF, de-hydrofluorination, is due to the equal distribution of repeated hydrogen-fluoride chains in PVDF. De-hydrofluorination may be followed by the formation of double bonds (chain scission, thereby more thermal stability), and/or may result in cross-linking of the polymer (fusing, thereby highly orientated fibrils and better mechanical strength). The de-hydrofluorination mechanisms of PVDF by pyrolysis may be expressed as follows [Madorsky, 1964].

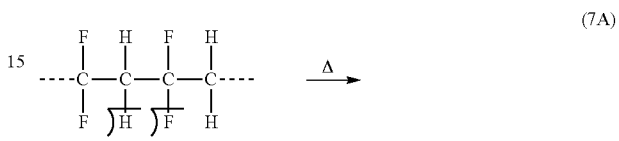
(7A)

(7B)

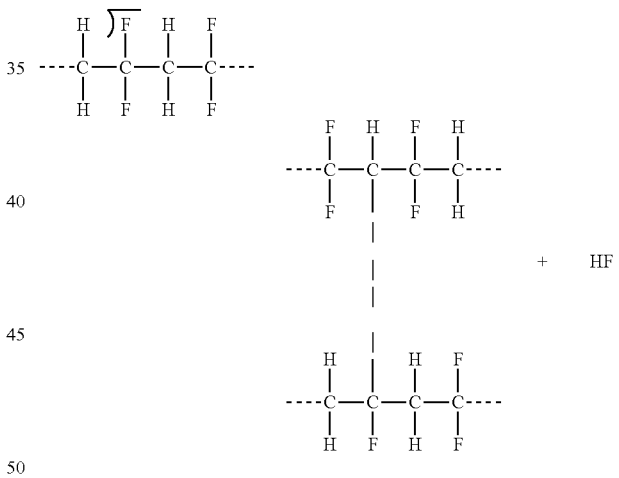

Chemically, rather than thermally, cross-linking modification of PVDF and/or equivalent materials to produce highly orientated interlinked semi-crystalline particle or globular structures is the underpinning objective of this invention. This can be achieved without replacing fluorine from the surface layer of a hydroflurocarbon polymer at high temperatures or degrading the bulk of the hydroflurocarbon polymer by pyrolysis. Thus, this invention provides methods for obtaining desired surface effects of PVDF or equivalent materials, which will now be explained by several points and illustrated by various non-limitative embodiments.

First, PVDF possesses two valuable properties of practical importance, which are the polymorphic and piezoelectric properties. In regards to the polymorphic properties, PVDF is a semi-crystalline polymer that is approximately 50% amorphous, wherein the monomer's structure is [—CH$_2$—

CF$_2$—], and the repeated chains occur mostly in a head to tail configuration. PVDF can be dissolved at low temperatures (e.g., <60° C.) in an organic solvent (as a primary solvent) such as N,N-dimethylacetamide (DMA), N,N-dimethylformamide (DMF), dimethylsulfoxide (DMSO), hexamethyl phosphoramide (HMPA), N-methyl-2-pyrrolidone (NMP), tetramethylurea (TMU), triethyl phosphate (TEP), trimethyl phosphate (TMP), acetone, methyl ethyl ketone (MEK), tetrahydrofuran (THF), and/or combinations thereof. This is unlike some hydroflurocarbon polymers such as PTFE (Teflon) or other hydrophobic materials such as polyethylene (PE) and polypropylene (PP). Because of its solubility in such solvents, the fabrication of PVDF membranes via wet, rather than melt, phase inversion methods is possible. Since PVDF is insoluble in water, the repeatedly reported medium (e.g., as a secondary solvent) for fabricating PVDF via phase inversion is usually water with or without peroxy compounds (e.g., containing the divalent group O—O) acting as polymerization catalysts. In regards to the piezoelectric properties (e.g., transfer mechanical energy to electrical energy and vice versa), the high Curie point (103° C.; the temperature above which the piezoelectric effect breaks down), and the response to an electric potential by acting along the backbone make PVDF a valuable material. Other useful properties of PVDF include high elastic modulus and high rigidity (resists deformation); resistance to heat, combustion, ageing and abrasion; chemically inert and non toxic; and stability to radiation (X-ray, UV and Gamma).

Second, one of the utilities of the polymorphic properties of PVDF is to form membranes. Recalling that a raw polymer must be soluble in a primary solvent, and, in turn, the primary solvent must be soluble in a secondary solvent, whereas the polymer is insoluble in the secondary phase; thereby de-mixing the polymer, as it is forced out of the primary solvent by the secondary solvent, into a polymer-rich phase and a surrounding polymer-lean solution. However, the polymer-rich phase may be dominated by amorphous particles (precipitation), pure crystalline polymorph particles (crystallization), or a concurrent combination of precipitation and crystallization. The differences among them lie in the formation process and the final product formed. As is the nature of this type of phase inversion, the formation process (the thereby predominance of either one) requires a proper effective secondary solvent and a precise control over the conditions (e.g., the rate of induction-time as related to instant or delayed de-mixing, and the rate of mass transfer as related to the level of saturation and stability) under which the thermodynamic and kinetic phase behaviors of the forming membrane are dictated. In this invention, crystallization of PVDF or an equivalent material is sought out to form effective and inexpensive membranes.

Third, amine solvents [including methylamine (ME), ethylamine (EA), isopropylamine (IPA), propylamine (PA), dimethylamine (DMA), diethylamine (DEA), diisopropylamine (DIPA), dipropylamine (DPA), trimethylamine (TMA), triethylamine (TEA), tripropylamine (TPA)] are unexpectedly found to be effective in crystallizing PVDF or an equivalent material to form the sought out membranes and other articles. Such amine solvents are weak bases, which do not generate hydroxyl ions directly by dissociation, but by reaction with water. For example, IPA reacts with water as follows:

  (8)

Yet, most weak bases are anions. For example, the fluoride ion is a weak base anion, which undergoes a similar reversible reaction with water as follows:

  (9)

In both cases of such weak bases, the forward reactions occur only to a slight extent to produce a weak acid (e.g., $CH_3CH_2CH_2NH_3^+$; HF); and an enough $OH^-$ ion to make the solution basic. Further, the reaction of the amine solvent (IPA for example) with hydrofluoric acid generates the amine solvent in an anionated form as follows:

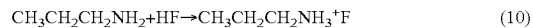  (10)

Here, the novelty of this invention resides with the use of an aqueous amine solvent as a weak base, thereby not as a strong denature, to pre-treat a solution of PVDF (or an equivalent material) dissolved in a primary solvent before phase inverting the solution; wherein the aqueous amine solvent gently draws some of the inorganic fluorine from the water-insoluble PVDF polymer for reaction, thereby generating the hydrofluoric acid by de-hydrofluorinating the PVDF; wherein implicit in this pre-treatment is the further reaction of the generated hydrofluoric acid with the aqueous amine solvent to regenerate the amine solvent in the anionated (fluorine) form; and wherein the amine solvent in the anionated form, as a weak anion base, represents a further step that draws in an essentially similar manner some of the fluorine from the water-insoluble PVDF polymer; thereby $OH^-$ ions are dissociated from the aqueous amine solvent, the released fluorine anion from PVDF and the amine solvent in the anionated form to diffuse in the PVDF polymer and bring it to reaction. The combined effects of the aqueous amine solvent and the amine solvent in the anionated form, which are not strong denaturants, minimize the disruption of inter-molecular interactions in PVDF (or an equivalent material), and leads to the formation of very fine crystalline clusters. The implication of this novelty of molecular interactions is that they serve as gentle re-crystallization media prior to phase inverting the PVDF solution.

Figure 9:
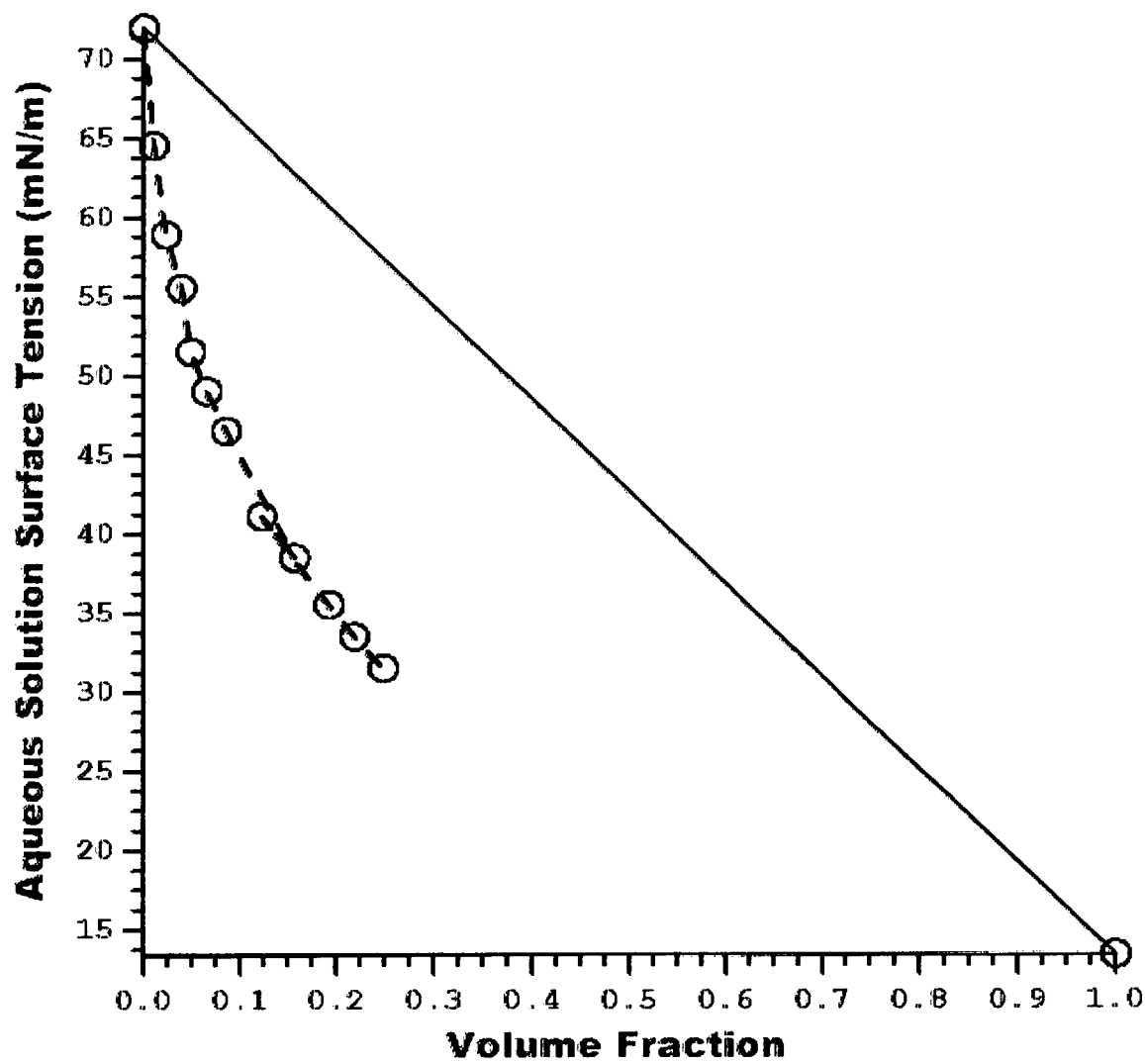
FIG. 9 illustrates surface tensions of the aqueous amine (TMA) solution.

Fourth, Table 4 presents the liquid surface tensions of water and the amine solvents. The liquid surface tensions ($\sigma_L$) of such amine solvents are not only much lower than $\sigma_L$ of water (Table 4), but also lower than the critical surface tension ($\sigma_C$) of PVDF (Table 3). Here, $\sigma_C$ is the surface tension at which a liquid just completely wets a surface ($\theta$=0). The ability of such an aqueous amine solvent to spread through the low energy PVDF solution depends on the volume fraction of the amine solvent in water to depress the surface tension of water ($\sigma_L$) in the aqueous amine solution ($\sigma_S$) preferably below $\sigma_C$ of PVDF. For example, $\sigma_L$ of $C_3H_9N$ [Table 4; (TMA: 13.4 mN/m; IPA: 17.5 mN/m)] is roughly about half $\sigma_C$ of PVDF [Table 3; (31.6 mN/m)]. FIG. 9 shows the surface tensions of the aqueous TMA solution as a function of volume fractions, and an essentially similar trend is exhibited by the aqueous IPA solution. Here, the volume fraction ($\varphi$) is defined as follows [Bader, 1999]:

$$\varphi_i = \left[ \frac{x_i v_i}{\sum_{i=1}^{2} x_i v_i} \right] \quad (11)$$

where $x_i$ is the mole fraction and $v_i$ is the pure solvent molar volume. A relatively small volume fraction of most of such amine solvents would thus reduce the interfacial tension of the aqueous amine solution to about or below $\sigma_C$ of PVDF.

It follows from the definition of $\sigma_C$ and the insolubility of PVDF in pure water that the novelty of this invention further resides in sufficiently lowering the surface tension of water in the aqueous amine solution by the amine solvent; thereby largely delaying the instantaneous de-mixing (precipitation) power of pure water prior to phase inverting the PVDF solution.

Fifth, the pores in a hydrophobic membrane are filled with the fluid that wets the membrane. The non-wetting fluid (water) does not permeate into pores of the membrane as long as the pressure on the non-wetting fluid side is kept below a critical value, which is known as the "liquid entry" or "breakthrough" pressure. For liquid-liquid de-mixing such as the de-mixing of wet-oil, for example, the "liquid entry" pressure of water (the non-wetting fluid) may be roughly approximated as follows:

$$\Delta P_E = \frac{-2\sigma\cos\theta_w}{r} \quad (12)$$

where $\sigma$ is the interfacial tension of the wet oil emulsion, $\theta_w$ is the water contact angle of the membrane, and r is the pore radius of the membrane. Eq. (12) implies that the higher the contact angle and the lower pore radius of the membrane, the higher is the liquid entry pressure of water. It follows from the definition of $\Delta P_E$ and the insolubility of PVDF in pure water that the novelty of this invention yet further resides in substantially increasing the water contact angle of the membrane by the aqueous amine solution and substantially decreasing the pore size of the membrane by limiting the water content in the aqueous amine solution prior to phase inverting the PVDF solution.

Figure 10:
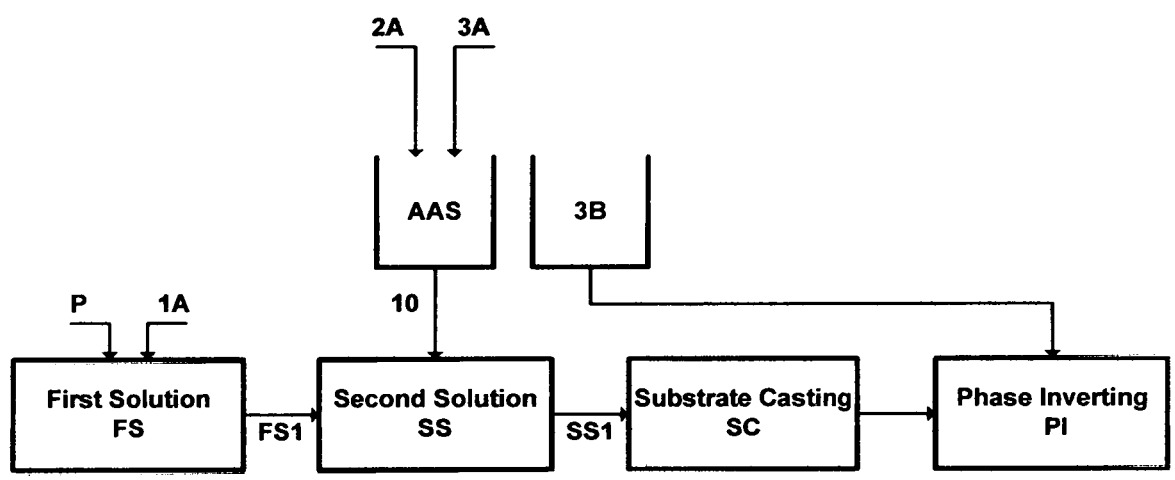
FIG. 10 illustrates the steps to prepare a material for casting a flat-sheet.

FIG. 10 depicts one embodiment of this invention, wherein an aqueous amine solution is utilized as a useful solvent in the polymer phase inversion method to form membranes in a flat-sheet configuration. As such, an amount of a polymer [P] is dissolved in an amount of a primary solvent [1A] to form a homogeneous first solution [FS]. An amount of an amine solvent [2A] is mixed with an amount of water [3A] to form an aqueous amine solution [AAS] to reduce $\sigma_S$ of the aqueous amine solution [AAS] to preferably about or below $\sigma_C$ of PVDF. An amount [10] of the aqueous amine solution [AAS], which now serves as a second solvent, is then mixed with an amount [FS1] of the first solution [FS] to control the crystal growth of the polymer [P] by conceiving near induction nuclei; thereby obtaining a readily tailored structural second solution [SS]. An amount of the second solution [SS1] is then casted on a substrate [SC], wherein this amount [SS1] controls the thickness of the casted second solution [SS] on the substrate. The casted substrate [SC] is phase inverted [PI] in a bath containing only water [3B] at a temperature preferably in the range of 5-25° C. The substrate containing the attached phase inverted membrane is removed from the bath; wherein the attached membrane is spontaneously veered away from the substrate as the flat sheet membrane, rinsed with water and dried by the atmospheric air (these latter steps are not shown in FIG. 10).

The hydroflurocarbon polymer [P] is selected from the group consisting of polyvinylidene fluoride (PVDF), polytrifluoroethylene (PFE), polychlorotrifluoroethylene (PCFE), fluorinated ethylene propylene (FEP), polyhexafluoropropylene (PHFP), and/or combinations thereof.

The primary solvent to dissolve the polymer is selected from the group consisting of N-methyl-2-pyrrolidone (NMP), N,N-dimethylacetamide (DMA), N,N-dimethylformamide (DMF), dimethylsulfoxide (DMSO), hexamethyl phosphoramide (HMPA), tetramethylurea (TMU), triethyl phosphate (TEP), trimethyl phosphate (TMP), acetone, methyl ethyl ketone (MEK), tetrahydrofuran (THF), and/or combinations thereof.

The amine solvent to form the aqueous amine solution is selected from the group consisting of methylamine (ME), ethylamine (EA), isopropylamine (IPA), propylamine (PA), dimethylamine (DMA), diethylamine (DEA), diisopropylamine (DIPA), dipropylamine (DPA), trimethylamine (TMA), triethylamine (TEA), tripropylamine (TPA), and/or combinations thereof.

Figure 11:
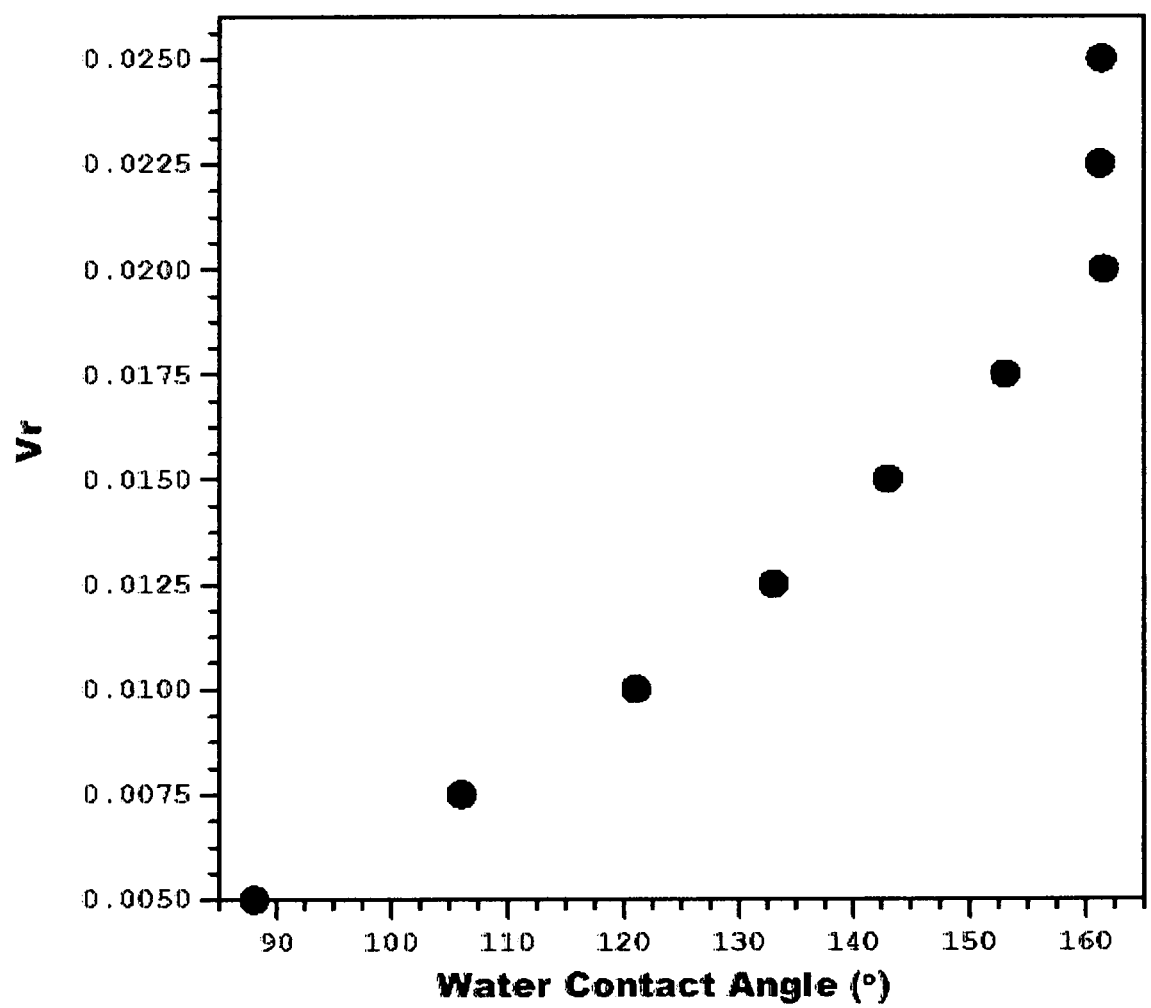
FIG. 11 illustrates the effect an aqueous amine solution on changing water contact angles.

Thus, successful flat-sheet membranes were made according to this invention in a multitude of variants. For example, in one variant, a PVDF powder (as a polymer [P]) and NMP (as a primary solvent [1A]) were mixed to form a homogenous first solution [FS] (3 vol % [P]: 97 vol % [1A]). IPA [2A] and water [3A] were mixed to form an aqueous amine solution [AAS]; wherein $\varphi$ of IPA in water was about 0.23 (about 6 mol %), which corresponded to about 31.1 mN/m of $\sigma_L$ the aqueous amine solution. Different amounts [10] of the aqueous amine solution [AAS] were then mixed with fixed amounts [FS1] of the first solution [FS] to form several second solutions [SS]. Each of the second solutions was casted on an inert substrate, each of the casted substrate was immersed in a bath containing only water for phase inversion, and each of the formed flat-sheet membranes is removed from each substrate and washed with water. FIG. 11 shows the water contact angle for each of the flat-sheet membrane as a function of the volume ratio ($V_r = V_1/V_{FS1}$), where the latter is the volume of the aqueous amine solution ($V_1$) to the volume of the first solution ($V_{FS1}$). The water contact angle ($\theta_w$) increased (88-161.5°) with increasing $V_r$, wherein a plateau is reached at higher $V_r$ values. The oil contact angle ($\theta_o$) practically approached zero; thereby oil would wet the membrane and spread freely over the membrane surface at a rate depending on the viscosity of oil and the roughness of the membrane surface. The cross-section and surface morphology of the membrane, as observed by scanning electron microscopy, revealed that the membrane surface is skinless, rough and with a structure comprising packed interconnected spherulitic particles. The structural ratio of fluorine to carbon in the original PVDF is reduced by roughly 17% in the PVDF membranes upon the addition of the aqueous amine solutions ($V_r$=0.02); which indicated that: (1) the chemical modification of PVDF by the aqueous amine solution took place, as essentially described in Paragraphs [0100] and [0101], thereby chemically de-hydrofluorinating the PVDF at ambient temperature, instead of thermally at high temperatures, in an essentially equivalent manner as given in Eq. (7B); and (2) the exhibited $\theta_w$ plateau at higher $V_r$ values (>0.02) revealed that the de-hydrofluorination of PVDF reached levels that would be structurally detrimental (e.g., lower the mechanical strength) to an unsupported thin flat-sheet membrane. The crystalline structure of the membranes, as observed by X-ray diffraction, revealed that the degree of crystallinity increased with increasing $V_r$ with patterns corresponded to the β crystalline phase of PVDF. This is consistent with the phase inversion approach in this invention since the β crystalline phase formed from wet PVDF, which it has actually more intermolecular stability. The structure of β phase forces the fluorine atoms along the carbon backbone to come closer together, which allows tighter packing density and reduces the intermolecular strain, thereby allowing greater chain interconnectivity and more dipolar alignment giving the PVDF membrane its strong piezoelectric properties. Such very desirable properties would come into play, as explained in Paragraph [0080], in applying an electrical field to the PVDF membrane (if required) to aid in wet oil phase de-mixing.

A flat-sheet configuration is very useful in different applications including, for example, inserting the inventive flat-sheet in a cartridge or a disc device to immediately separate oil from water in a wet oil sample to immediately determine the water content and/or oil content by any preferred analytical, gravimetrical or other method, replacing conventional coalescing packings of a 3-phase separator in a GC (see e.g., FIG. 7B) by the invented flat-sheets in submerged membrane modules to effectively directly simultaneously separate oil from water within the 3-phase separator, wastewater membrane bioreactors, among other applications. A solid-fiber configuration utilizing the piezoelectric property of PVDF is very useful in different applications including, for example, energy harvesters (e.g., solar panels), mechanical actuators, strain sensors, artificial muscles, and nearly completely non-porous membranes for higher pressure applications. A hollow-fiber configuration is also very useful in, for example, a liquid-liquid or a gas-liquid contactor especially for standalone membrane applications. However, the three essential formation differences among these configurations are morphology, viscosity, and tension/stress. For a flat-sheet configuration or a solid-fiber configuration, morphology adjustments start naturally from the outer surface of a cast or extrude film after immersing in a phase inverting bath. For a hollow-fiber configuration, morphology adjustments are simultaneously required for the inner (lumen side) and the outer (shell side) surfaces, wherein the inner surface is controlled by a bore fluid (e.g., liquid or gas) as an internally phase inverting media, and wherein the outer surface is controlled by a solvent in an externally phase inverting bath. The required viscosity for a polymer solution (a dissolved polymer in a primary solvent) for spinning a solid-fiber or a hollow-fiber may be an order of magnitude higher than that for casting a flat-sheet; thereby the required amount of the polymer for the solid-fiber or the hollow-fiber may be in the order of 3-times the required amount for the flat-sheet. Unlike the formation of the flat-sheet, the solid-fiber or the hollow-fiber is usually formed under tension and/or stress.

Figure 12A:
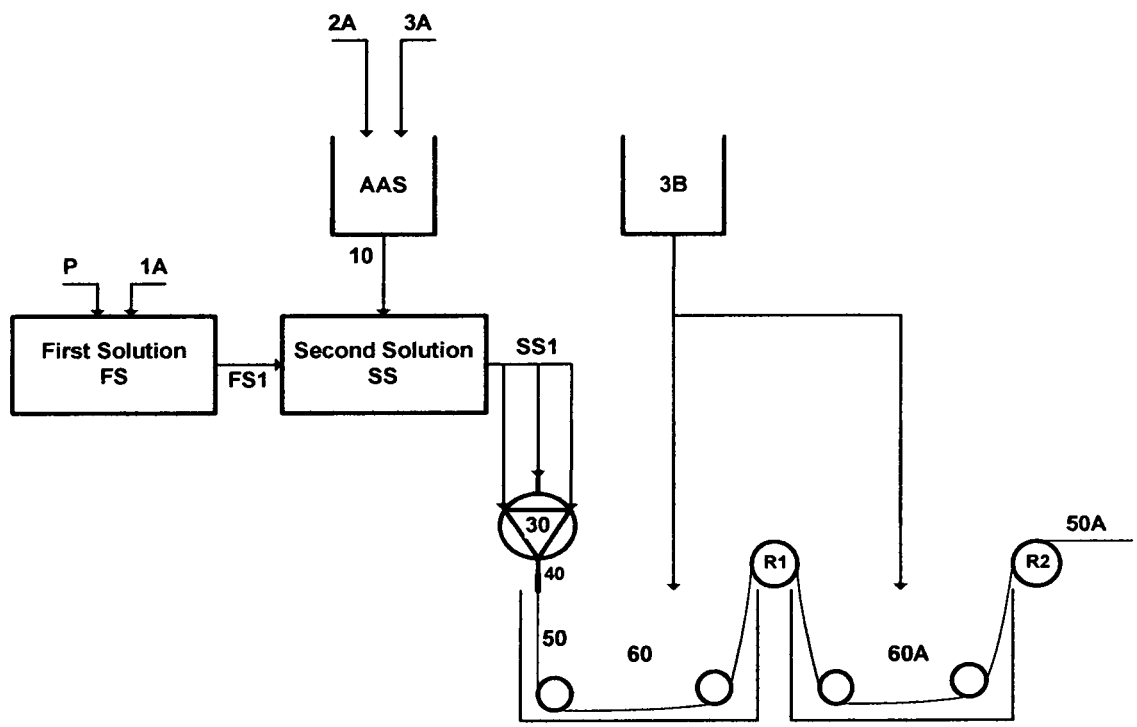
FIG. 12A illustrates the steps to prepare a material for extruding a solid-fiber.

FIG. 12A depicts another embodiment of this invention, wherein an aqueous amine solution is utilized as a useful solvent in the polymer phase inversion method to form membranes in a solid-fiber configuration. An amount of a polymer [P] is dissolved in an amount of a primary solvent [1A] to form a homogeneous first solution [FS]. An amount of an amine solvent [2A] is mixed with an amount of water [3A] to form an aqueous amine solution [AAS]. An amount [10] of the aqueous amine solution [AAS] is mixed with an amount [FS1] of the first solution [FS] to form a second solution [SS]. An amount [SS1] of the second solution [SS] is extruded through a spinneret [30]. At the exit of the spinneret, conceived fibers [50] may pass through an air gap [40] before entering a first spinning bath [60] containing only water [3B] for phase inverting at a temperature preferably in the range of 5-25° C. After the first spinning bath [60], the pre-solidified solid-fiber is wound to the first roller [R1], and then it is exposed to a second bath [60A] containing also only water for washing and a further solidification, wherein a second drafting occurs between the first roller [R1] and a second roller [R2]. The second drawing mostly solidifies the solid-fiber, and if needed, freeze drying or hot air drafting may be applied (not shown in FIG. 12A) to the spun solid-fiber [50A] prior to winding.

Figure 12B:
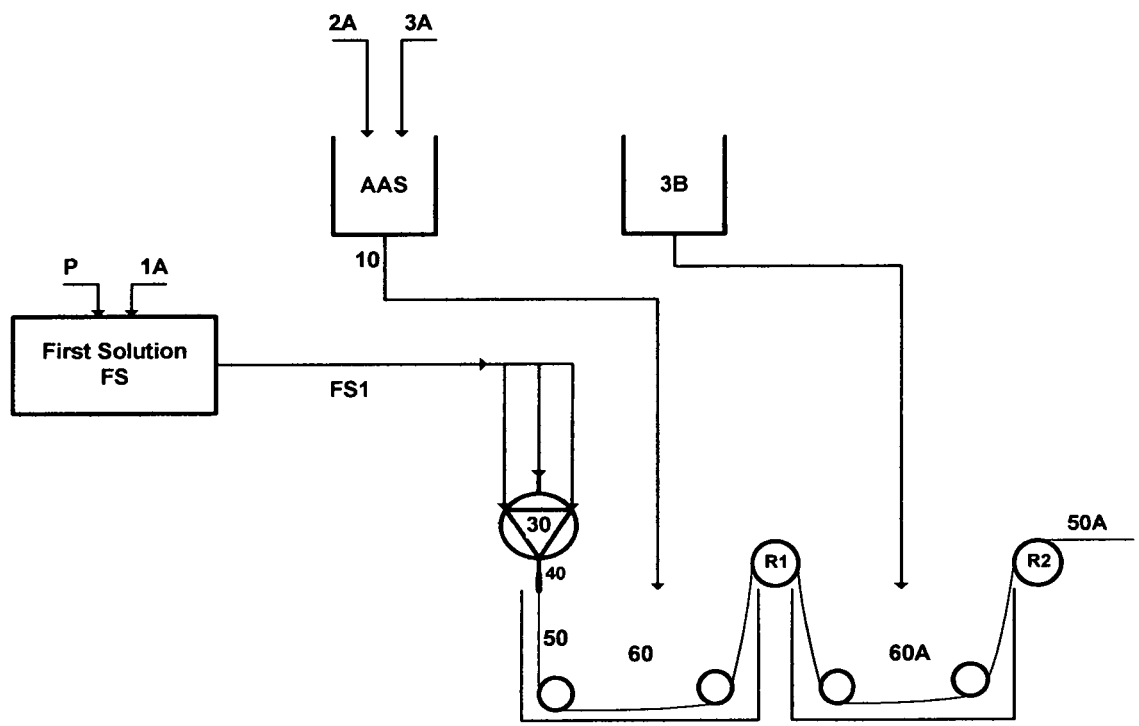
FIG. 12B illustrates another set of steps to prepare a material for extruding a solid-fiber.

FIG. 12B depicts a further embodiment of this invention, wherein an aqueous amine solution is utilized as a useful solvent in the polymer phase inversion method to form membranes in a solid-fiber configuration; which differs from FIG. 12A in that: (1) an amount [FS1] of the first solution [FS] is extruded through the spinneret [30]; and (2) an amount [10] of the aqueous amine solution [AAS], instead of only water, is used in the first spinning bath [60], before phase inverting the extruded solid-fiber in the second bath [60A] that contains only water to form the solid-fiber.

Figure 13A:
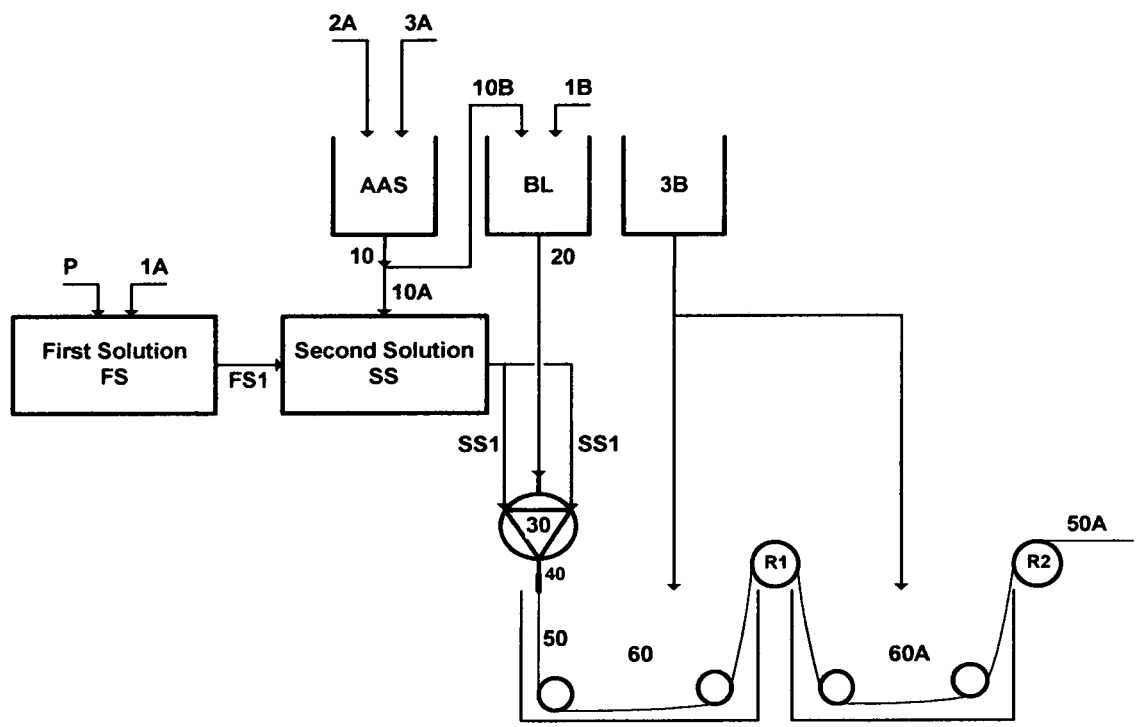
FIG. 13A illustrates the steps to prepare a material for extruding a hollow-fiber.

FIG. 13A depicts yet a further embodiment of this invention, wherein an aqueous amine solution is utilized as a useful solvent in the polymer phase inversion method to form membranes in a hollow-fiber configuration. An amount of a polymer [P] is dissolved in a first amount of a primary solvent [1A] to form a homogeneous first solution [FS]. An amount of an amine solvent [2A] is mixed with an amount of water [3A] to form an aqueous amine solution [AAS]. A first amount [10A] of the aqueous amine solution [AAS] is mixed with an amount [FS1] of the first solution [FS] to form a second solution [SS], which serves as an external coagulant to control the morphology of the outer surface of the hollow fiber. A second amount [10B] of the aqueous amine solution [AAS] is mixed with a second amount of the primary solvent [1B] to form a bore liquid [BL], which serves as an internal coagulant to reduce the resistance and control the morphology of the inner surface of a hollow fiber. An amount [SS1] of the second solution [SS] and an amount [20] of the bore liquid [BL] are extruded through a spinneret [30]. At the exit of the spinneret, conceived fibers [50] pass through an air gap [40] before entering a first spinning bath [60] containing only water [3B] for phase inverting at a temperature preferably in the range of 5-25° C. After the first spinning bath [60], the pre-solidified hollow-fiber is wound to the first roller [R1], and then it is exposed to a second bath [60A] containing also only water for washing and a further solidification, wherein a second drafting occurs between the first roller [R1] and a second roller [R2]. The second drawing mostly solidifies the hollow fiber, and if needed, freeze drying or hot air drafting may be applied (not shown in FIG. 13A) to the spun hollow-fiber [50A] prior to winding.

Figure 13B:
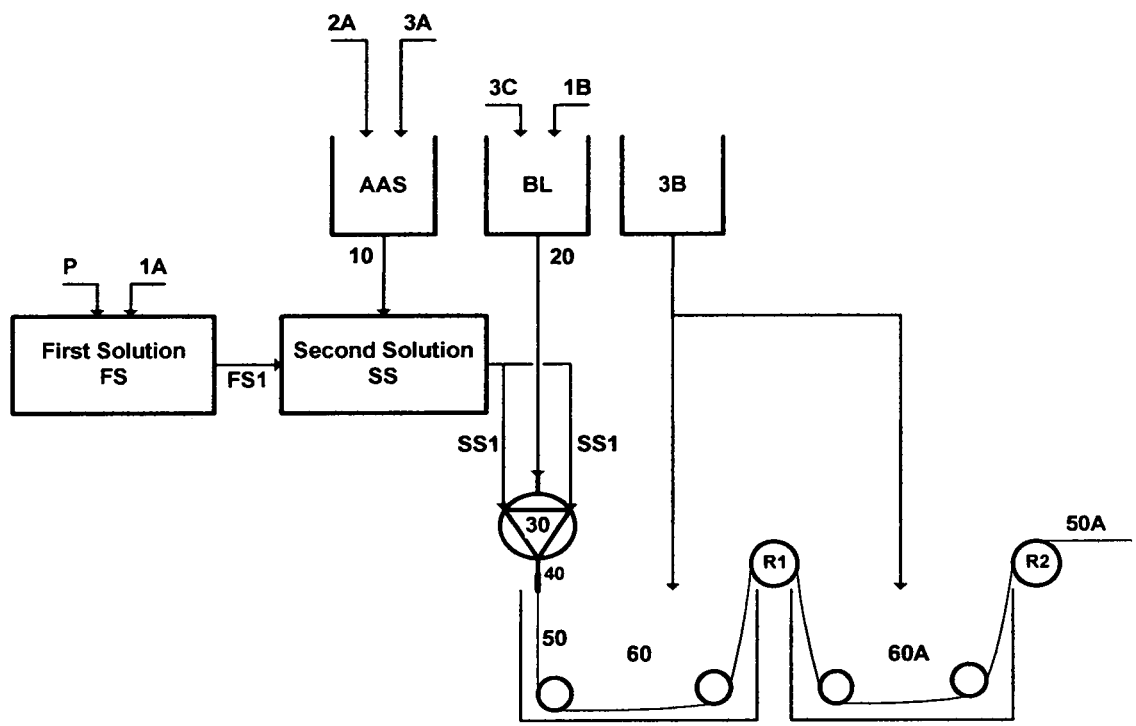
FIG. 13B illustrates another set of steps to prepare a material for extruding a hollow-fiber.

FIG. 13B depicts yet a further embodiment of this invention, wherein an aqueous amine solution is utilized as a useful solvent in the polymer phase inversion method to form membranes in a hollow-fiber configuration; which differs from FIG. 13A in that the second amount of the primary solvent [1B] is mixed with an amount of water [3C], instead of the second amount of the aqueous amine solution [10B], to form the bore liquid [BL].

Figure 13C:
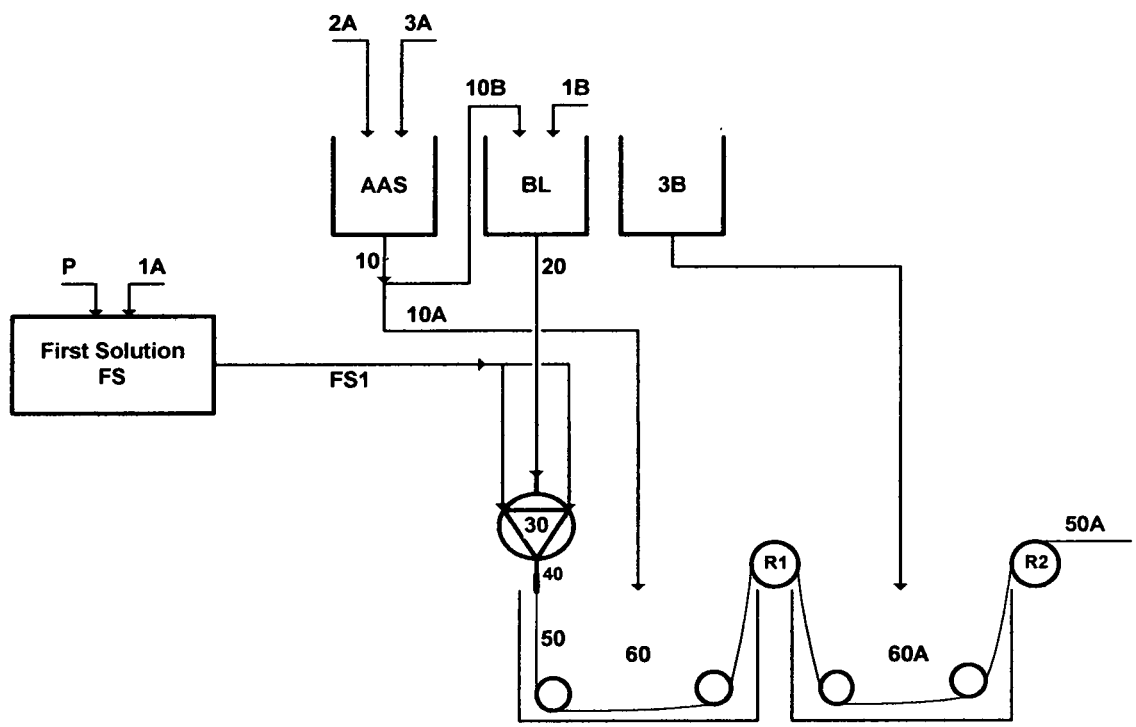
FIG. 13C illustrates a further set of steps to prepare a material for extruding a hollow-fiber.

FIG. 13C depicts yet a further embodiment of this invention, wherein an aqueous amine solution is utilized as a useful solvent in the polymer phase inversion method to form membranes in a hollow-fiber configuration; which differs from FIG. 13A in that: (1) an amount [FS1] of the first solution [FS] and an amount [20] of the bore liquid [BL] are extruded through the spinneret [30]; and (2) the first amount [10A] of the aqueous amine solution [AAS] is used, instead of only water, in the first spinning bath [60], before phase inverting the extruded hollow-fiber in the second bath [60A] that contains only water to form the hollow-fiber membrane.

Figure 13D:
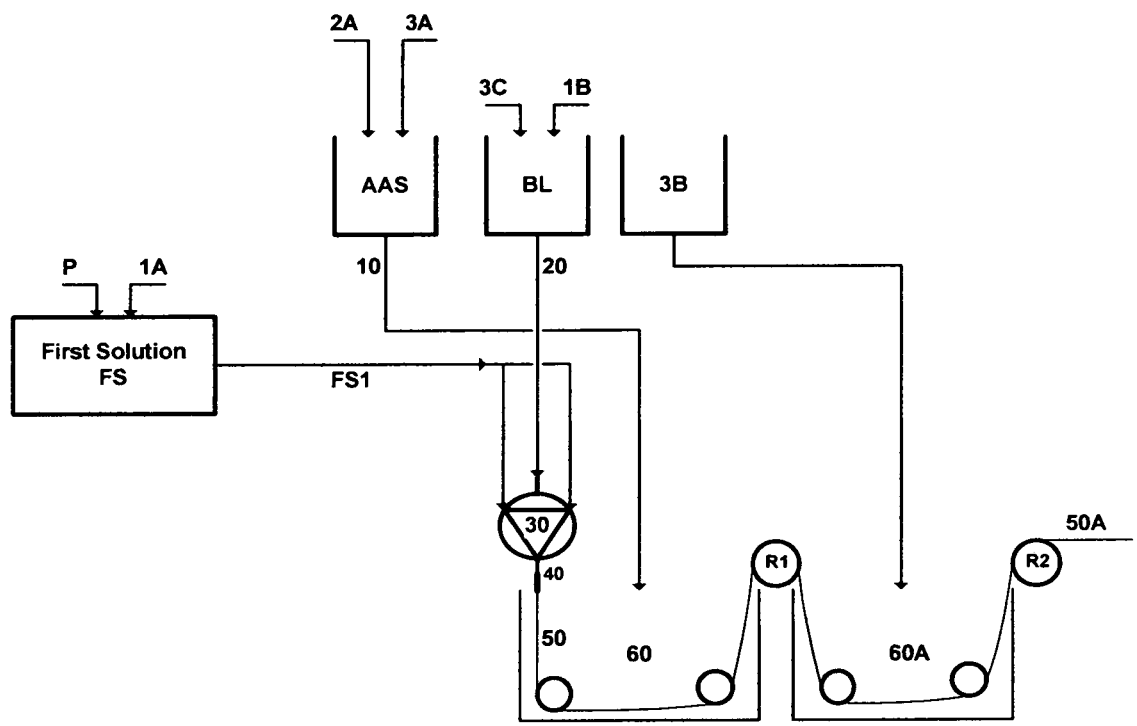
FIG. 13D illustrates yet a further set of steps to prepare a material for extruding a hollow-fiber.

FIG. 13D depicts yet a further embodiment of this invention, wherein an aqueous amine solution is utilized as a useful solvent in the polymer phase inversion method to form membranes in a hollow-fiber configuration; which differs from FIG. 13A in that: (1) the second amount of the primary solvent [1B] is mixed with the amount of water [3C], instead of the second amount of the aqueous amine solution [10B], to form the bore liquid [BL]; (2) an amount [FS1] of the first solution [FS] and an amount [20] of the bore liquid [BL] are extruded through the spinneret [30]; and (3) an amount [10] of the aqueous amine solution [AAS] is used, instead of only water, in the first spinning bath [60], before phase inverting the extruded hollow-fiber in the second bath [60A] that contains only water to form the hollow-fiber membrane.

The above described inventive methods of utilizing an aqueous amine solution are aimed at semi-crystalline polymers; wherein fine crystal clusters are selectively and relatively slowly formed from a polymer dissolved in a primary solvent by the aqueous amine solution resulting in crystalline polymorph structures. Generated hydrophilic membranes by phase inverting glassy polymers (e.g., polysulfone, cellulose acetate, regenerated cellulose, nitrocellulose, polyamide, polyimide, etc.) usually involved very rapid precipitation resulting in amorphous macro-void structures. However, the utilization of an aqueous amine solution as described in this invention can be extended to such glassy polymers to form membranes with the structures free of such undesirable macro-voids.

TABLE 1

Samples of Oil from Carbonate Formations.

| Area | AN | BN | A | ρ | μ |
|---|---|---|---|---|---|
| Arabian Gulf | 0.09 | 0.65 | 1.1 | 0.851 | 10.6 |
| North Sea | 0.10 | 2.46 | 0.3 | 0.843 | 8.9 |

AN: Acid Number (mg KOH/g Oil); BN: Base Number (mg KOH/g Oil); A: Asphaltene (%); ρ: Density at 25° C. (g/cm$^3$); and μ: Viscosity at 25° C. (cp or mPa. sec).

TABLE 2

Samples of Seawater, Sulfate-Enriched Seawater and Formation Water.

| Ion (meq./L) | Arabian Gulf | | | | North Sea | | | |
|---|---|---|---|---|---|---|---|---|
| | S1A | S2A | S3A | S4A | S1N | S2N | S3N | S4N |
| $Na^+$ | 529.1 | 692.6 | 3,250.0 | 337.0 | 487.0 | 637.4 | 2,404.4 | 1,531.3 |
| $K^+$ | 10.7 | 12.1 | 84.0 | 9.7 | 9.5 | 10.7 | 38.1 | |
| $Mg^{+2}$ | 125.9 | 332.1 | 286.8 | 49.4 | 107.0 | 282.2 | 154.7 | 6.3 |
| $Ca^{+2}$ | 27 | 52.5 | 1,129.0 | 117.5 | 20.1 | 38.9 | 1,205 | 35.3 |
| $Sr^{+2}$ | 0.2 | 0.5 | 13.7 | 1.6 | 0.2 | 0.5 | 39.7 | 33 |
| $Ba^{+2}$ | | | | | | | 18.9 | 23.4 |
| $Cl^-$ | 623 | 823.5 | 4,752.1 | 462.6 | 557.1 | 695.8 | 3,723.2 | 1,655.1 |
| $HCO_3^-$ | 2.3 | 8.2 | 4.3 | 4.0 | 3.0 | 8.1 | 26.6 | 26.6 |
| $SO_4^{-2}$ | 64.6 | 251.6 | 6.8 | 61.5 | 55.2 | 215.1 | 0.1 | 0.3 |
| $SO_4/Ca$ | 2.4 | 4.8 | | | 2.8 | 5.5 | | |
| $SO_4/Mg$ | 0.5 | 0.8 | | | 0.5 | 0.8 | | |

S1A and S1N: Seawater;
S2A and S2N: 4-times sulfate enriched seawater by NF (NF reject streams);
S3A: Formation Water from a Limestone (fossiliferous) Oil-Bearing Matrix;
S4A: Formation Water from a Dolomite Oil-Bearing Matrix;
S3N: Formation Water from a Limestone (Chalk) Oil-Bearing Matrix; and
S4N: Formation Water from a Sandstone (Quartz) Oil-Bearing Matrix.

TABLE 3

Critical Surface Tensions ($\sigma_C$) and Water Contact Angles ($\theta_w$).

| Material | $\sigma_C$ (mN/m) | $\theta_w$ (°) |
|---|---|---|
| polymethyl methacrylate (PMMA) | 37.5 | 70.9 |
| Polyvinyl alcohol (PVA) | 37 | 51 |
| Polyethylene oxide (PEO) | 43 | 63 |
| Polyethylene glycol (PEG) | 43 | 63 |
| Polysulfone (PSU) | 42.1 | 70.5 |
| Polystyrene (PS) | 34 | 87.4 |
| Polyethylene (PE) | 31.6 | 96 |
| Polypropylene (PP) | 30.5 | 102.1 |
| Polyvinyl fluoride (PVF) | 32.7 | 84.5 |
| Polyvinylidene fluoride (PVDF) | 31.6 | 89 |
| Polytrifluoroethylene (PFE) | 26.5 | 92 |
| Polychlorotrifluoroethylene (PCFE) | 30.8 | 99.3 |
| Fluorinated ethylene propylene (FEP) | 19.1 | 108.5 |
| Polytetrafluoroethylene (PTFE) | 19.4 | 112 |
| Polyhexafluoropropylene (PHFP) | 16.9 | 112 |

TABLE 4

Selected Properties of Solvents.

| Solvent | $\sigma_L$ (mN/m) | MV (A$^3$) | BP (° C.) | VP (mmHg) | ρ (g/cm$^3$) | μ (cp) |
|---|---|---|---|---|---|---|
| Water ($H_2O$) | 71.9 | 30.0 | 100.0 | 23.6 | 0.998 | 0.76 |
| MA ($CH_5N$) | 19.2 | 73.4 | −6.4 | 2,680.1 | 0.703 | 0.19 |
| DMA($C_2H_7N$) | 26.3 | 114.1 | 6.9 | 1,475.3 | 0.656 | 0.21 |
| TMA ($C_3H_9N$) | 13.4 | 155.1 | 3.0 | 1,699.2 | 0.633 | 0.32 |
| EA ($C_2H_7N$) | 19.1 | 109.6 | 16.6 | 1,062.2 | 0.683 | 0.24 |
| DEA($C_4H_{11}N$) | 19.9 | 171.8 | 55.5 | 235.7 | 0.707 | 0.33 |
| TEA ($C_6H_{15}N$) | 20.2 | 230.8 | 89.6 | 67.7 | 0.728 | 0.34 |
| IPA ($C_3H_9N$) | 17.5 | 142.7 | 32.4 | 575.1 | 0.688 | 0.36 |
| PA ($C_3H_9N$) | 21.8 | 136.9 | 48.7 | 313.5 | 0.717 | 0.34 |
| DIPA ($C_6H_{15}N$) | 19.1 | 234.4 | 83.5 | 79.4 | 0.717 | 0.40 |
| DPA ($C_6H_{15}N$) | 22.3 | 227.7 | 109.3 | 24.1 | 0.738 | 0.50 |
| TPA ($C_9H_{21}N$) | 22.4 | 178.4 | 158.0 | 1.5 | 0.753 | |

$\sigma_L$: Surface Tension at 25° C.;
MV: Molecular Volume;
BP: Boiling Point; and
VP: Vapor Pressure at 25° C.

What is claimed is:

1. A method of preparing a separation membrane for separating wet oil by casting a flat-sheet, said method comprising the steps of: (a) dissolving an amount of a polymer in an amount of a primary solvent to form a first solution; (b) mixing an amount of an amine solvent with an amount of water to form an aqueous amine solution; (c) mixing an amount of said first solution with an amount of said aqueous amine solution to form a second solution; thereby inducing selective fine crystal clusters of said polymer, without rapidly precipitating said polymer, and without degrading the bulk of the structure of said polymer; (d) casting an amount of said second solution on a substrate; and (e) phase inverting said substrate in a bath containing only water to form said flat-sheet.

2. The method of claim 1, wherein said polymer is selected from the group consisting of polyvinylidene fluoride, polytrifluoroethylene, polychlorotrifluoroethylene, fluorinated ethylene propylene, polyhexafluoropropylene, and combinations thereof.

3. The method of claim 1, wherein said primary solvent is selected from the group consisting of N-methyl-2-pyrrolidone, N,N-dimethylacetamide, N,N-dimethylformamide, dimethylsulfoxide, hexamethyl phosphoramide, tetramethylurea, triethyl phosphate, trimethyl phosphate, acetone, methyl ethyl ketone, tetrahydrofuran, and combinations thereof.

4. The method of claim 1, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

5. A method of preparing a separation membrane for separating wet oil by extruding a solid-sheet, said method comprising the steps of: (a) dissolving an amount of a polymer in an amount of a primary solvent to form a first solution; (b) mixing an amount of an amine solvent with an amount of water to form an aqueous amine solution; (c) mixing an amount of said first solution with an amount of said aqueous amine solution to form a second solution; thereby inducing selective fine crystal clusters of said polymer, without rapidly precipitating said polymer, and without degrading the bulk of the structure of said polymer; (d) extruding an amount of said second solution through a spinneret to produce an extruded solid fiber; and (e) phase inverting said extruded solid fiber in at least a bath containing only water to form said solid-sheet.

6. The method of claim 5, further comprising replacing the steps (c) through (e) by the following steps: extruding an amount of said first solution through said spinneret to produce said extruded fiber; subjecting said extruded fiber to a bath containing an amount of said aqueous amine solution; and thereafter phase inverting said extruded solid fiber in said bath containing said only water to form said solid-sheet.

7. The method of claim 5, wherein said polymer is selected from the group consisting of polyvinylidene fluoride, polytrifluoroethylene, polychlorotrifluoroethylene, fluorinated ethylene propylene, polyhexafluoropropylene, and combinations thereof.

8. The method of claim 5, wherein said primary solvent is selected from the group consisting of N-methyl-2-pyrrolidone, N,N-dimethylacetamide, N,N-dimethylformamide, dimethylsulfoxide, hexamethyl phosphoramide, tetramethylurea, triethyl phosphate, trimethyl phosphate, acetone, methyl ethyl ketone, tetrahydrofuran, and combinations thereof.

9. The method of claim 5, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

10. A method of preparing a separation membrane for separating wet oil by extruding a hollow fiber, said method comprising the steps of: (a) dissolving an amount of a polymer in a first amount of a primary solvent to form a first solution; (b) mixing an amount of an amine solvent with an amount of water to form an aqueous amine solution; (c) mixing an amount of said first solution with a first amount of said aqueous amine solution to form a second solution;
thereby controlling the morphology of the outer surface of said hollow fiber; (d) mixing a second amount of said primary solvent with a second amount of said aqueous amine solution to form a bore liquid; thereby controlling the morphology of the inner surface of said hollow fiber; (e) extruding an amount of said second solution and an amount of said bore liquid through a spinneret to produce an extruded hollow-fiber; and (f) phase inverting said extruded hollow-fiber in at least a bath containing only water to form said hollow-fiber.

11. The method of claim 10, further comprising replacing step (d) by: mixing said second amount of said primary solvent with an amount of water to form said bore liquid.

12. The method of claim 10, further comprising replacing steps (c), (e) and (f) by the following steps: extruding an amount of said first solution and an amount of said bore liquid through said spinneret to produce said extruded hollow-fiber; subjecting said extruded hollow-fiber to a bath containing an amount of said aqueous amine solution; and thereafter phase inverting said extruded hollow-fiber in said bath containing said only water to form said hollow-fiber.

13. The method of claim 10, further comprising replacing steps (c) through (f) by the following steps: mixing said second amount of said primary solvent with an amount of water to form said bore liquid; extruding an amount of said first solution and an amount of said bore liquid through said spinneret to produce said extruded hollow-fiber;
subjecting said extruded hollow-fiber to a bath containing an amount of said aqueous amine solution; and thereafter phase inverting said extruded hollow-fiber in said bath containing only water to form said hollow-fiber.

14. The method of claim 10, wherein said polymer is selected from the group consisting of polyvinylidene fluoride, polytrifluoroethylene, polychlorotrifluoroethylene, fluorinated ethylene propylene, polyhexafluoropropylene, and combinations thereof.

15. The method of claim 10, wherein said primary solvent is selected from the group consisting of N-methyl-2-pyrrolidone, N,N-dimethylacetamide, N,N-dimethylformamide, dimethylsulfoxide, hexamethyl phosphoramide, tetramethylurea, triethyl phosphate, trimethyl phosphate, acetone, methyl ethyl ketone, tetrahydrofuran, and combinations thereof.

16. The method of claim 10, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

* * * * *